(12) United States Patent
Sytnik et al.

(10) Patent No.: US 11,727,543 B2
(45) Date of Patent: Aug. 15, 2023

(54) SYSTEMS AND METHODS FOR CONTENT-AWARE ENHANCEMENT OF IMAGES

(71) Applicant: Shinyfields Limited, Nicosia (CY)

(72) Inventors: Dmitry Sytnik, Kyiv (UA); Irina Lisova, Kyiv (UA); Andrey Frolov, Kyiv Oblast (UA)

(73) Assignee: Shinyfields Limited, Nicosia (CY)

( * ) Notice: Subject to any disclaimer, the term of this patent is extended or adjusted under 35 U.S.C. 154(b) by 325 days.

(21) Appl. No.: 16/951,820

(22) Filed: Nov. 18, 2020

(65) Prior Publication Data

US 2021/0150676 A1    May 20, 2021

Related U.S. Application Data

(60) Provisional application No. 62/936,835, filed on Nov. 18, 2019.

(51) Int. Cl.
*G06T 5/00* (2006.01)
*G06T 5/20* (2006.01)
*G06T 5/50* (2006.01)

(52) U.S. Cl.
CPC ............... *G06T 5/005* (2013.01); *G06T 5/20* (2013.01); *G06T 5/50* (2013.01); *G06T 2200/24* (2013.01); *G06T 2207/20084* (2013.01); *G06T 2207/20221* (2013.01)

(58) Field of Classification Search
CPC .. G06T 5/005; G06T 5/20; G06T 5/50; G06T 2200/24; G06T 2207/20084; G06T 2207/20221; G06T 2207/20016; G06T 2207/30196; G06T 7/11; G06T 7/136; G06T 7/194; G06T 5/003; G06T 2207/10024; G06T 2207/20012; G06T 2207/20081

See application file for complete search history.

(56) References Cited

U.S. PATENT DOCUMENTS 10,593,021 B1 * 3/2020 Shen .................. G06T 5/003
11,205,086 B2 * 12/2021 Sriram ................ G06V 10/454
2020/0242788 A1 * 7/2020 Jacobs ............. H04N 5/232933

OTHER PUBLICATIONS

"Dilation (morphology)", Wikipedia entry, archived Oct. 2, 2019: https://web.archive.org/web/20191002155651/https://en.wikipedia.org/wiki/Dilation_(morphology).
"Graph Transform Tool", GitHub Tensorflow Tools README file, archived Nov. 4, 2018: https://web.archive.org/web/20181104111318/https://github.com/tensorflow/tensorflow/blob/master/tensorflow/tools/graph_transforms/README.md.

(Continued)

*Primary Examiner* — Phuoc Tran
(74) *Attorney, Agent, or Firm* — Brown Rudnick LLP

(57) ABSTRACT

Exemplary embodiments are directed to a system for content-aware enhancement of an image. The system includes an interface configured to receive as input an original image, and a processing device in communication with the interface. The processing device is configured to process the original image to detect one or more objects in the original image, generate an in-focus person mask of the original image for one or more in-focus people in the original image, and apply one or more enhancements to areas of the original image excluding the in-focus person mask.

16 Claims, 20 Drawing Sheets
(12 of 20 Drawing Sheet(s) Filed in Color)

(56) References Cited

OTHER PUBLICATIONS

Chen et al., "Encoder-Decoder with Atrous Separable Convolution for Semantic Image Segmentation", in Lecture Notes in Computer Science: Computer Vision—ECCV 2018, pp. 833-851.
Farbman et al., "Coordinates for Instant Image Cloning", in SIGGRAPH '09: ACM SIGGRAPH 2009 papers, Jul. 2009, Article No. 67, pp. 1-9.
He et al., "Guided Image Filtering", Proceedings of the European Conference on Computer Vision (ECCV) 2010, pp. 1-14.
He et al., "Guided Image Filtering", IEEE Transactions on Pattern Analysis and Machine Intelligence (vol. 35, Issue: 6, Jun. 2013), pp. 1397-1409.
Paris et al., "Local Laplacian Filters: Edge-aware Image Processing with a Laplacian Pyramid", ACM Transactions on Graphics (Proceedings of SIGGRAPH 2011), Communications of the ACM (Mar. 2015, vol. 58, No. 3).
Sandler et al., "MobileNetV2: Inverted Residuals and Linear Bottlenecks", Proceedings of the IEEE Conference on Computer Vision and Pattern Recognition (CVPR) 2018, pp. 4510-4520.

\* cited by examiner

SYSTEMS AND METHODS FOR CONTENT-AWARE ENHANCEMENT OF IMAGES

CROSS-REFERENCE TO RELATED APPLICATIONS

The present application claims the benefit of priority to U.S. Provisional Application No. 62/936,835, filed Nov. 18, 2019, which is hereby incorporated by reference in its entirety.

TECHNICAL FIELD

The present disclosure relates generally to computer-based systems and methods for altering or editing digital images. More specifically, the present disclosure relates to systems and methods for content-aware enhancement of images, in order to generate a realistic and improved image in an efficient manner.

BACKGROUND

There are several features that can affect the quality and/or appearance of a photograph or image. One of the key features of a beautiful and high-quality image can be the expressive details and correctly configured local contrast. During editing of images, professionals often adjust or improve the detail and local contrast to increase the expressiveness of the image. While improving the local contrast can significantly improve the overall image quality and solve the problem of lack of detail and/or clarity, such improvement also typically increases the detail in the entire image due to the application of the local contrast effect on the entire image. As such, while the local contrast adjustment can improve the detail and clarity of some portions of the image, such adjustment can negatively affect other parts of the image. The appearance of all objects in the image will not be improved if the same settings are applied across the board to increase details.

Traditional adjustments of clarity and structure in images can also add undesired artifacts to the image, such as noise, hue shifts, halos, combinations thereof, or the like. Therefore, while such adjustments can increase the detail of the image, the adjustments can simultaneously generate the undesired artifacts. Improving the quality and detail of images for mobile devices (e.g., smart phones, laptops, or the like) can be increasingly difficult due to the implementation of lower quality optics in the built-in cameras (as compared to large professional cameras).

A need exists for systems and methods for content-aware enhancement of images that allow for an automatic and efficient process of enhancement of images having varying complexities. The systems and methods of the present disclosure solve these and other needs.

SUMMARY

In accordance with embodiments of the present disclosure, an exemplary system for content-aware enhancement of an image is provided. The system includes an interface configured to receive as input an original image, and a processing device in communication with the interface. The processing device can be configured to process the original image using a neural network to detect one or more objects in the original image, generate an in-focus person mask of the original image for one or more in-focus people in the original image, and apply one or more enhancements to areas of the original image excluding the in-focus person mask.

The processing device can generate a person mask encompassing one or more people in the original image. The processing device can generate an out-of-focus mask encompassing out-of-focus areas in the original image. The processing device can generate the in-focus person mask, the in-focus person mask being a difference between the person mask and the out-of-focus mask. The processing device can blur a transition between the in-focus person mask and out-of-focus areas of the original image. The areas excluded the in-focus person mask can be out-of-focus areas of the original image. The processing device can generate a grayscale image based on the original image. The processing device can generate a modulated image, the modulated image generated by application of a modified Laplacian effect on the grayscale image.

The processing device can generate a filtered detail image, the filtered detail image generated by application of a guided filter on the modulated image. The processing device can generate a red-green-blue detail image. The processing device can generate a brightness image, the brightness image depicting changes in brightness across the red-green-blue detail image. The processing device can generate a color corrected image, the color corrected image correcting saturation loss in the brightness image to enhance colors in the color corrected image. The processing device can generate a segmented mask based on the original image. The segmented mask can exclude a sky, water and people in the original image. The processing device can generate a structure boosted image, the structure boosted image including enhanced details of the original image. The processing device can generate a combined image, the combined image including a blend between an enhanced image and the structure boosted image.

In some embodiments, the interface can include an image selection section with the combined image and one or more additional original images. In some embodiments, the interface can include a first submenu for selecting the combined image and copying the one or more enhancements applied to the combined image. The interface can include a second submenu for selecting one or more of the additional original images and applying the copied one or more enhancements of the combined image to the selected one or more of the additional original images.

In accordance with embodiments of the present disclosure, an exemplary method for content-aware enhancement of an image is provided. The method can include receiving as input at an interface an original image, detecting one or more objects in the original image with a neural network, generating an in-focus person mask of the original image for one or more in-focus people in the original image, and applying one or more enhancements to areas of the original image excluding the in-focus person mask.

In accordance with embodiments of the present disclosure, and exemplary non-transitory computer-readable medium storing instructions at least for content-aware enhancement of an image is provided. The instructions are executable by a processing device. Execution of the instructions by the processing device can cause the processing device to receive as input at an interface an original image, detect one or more objects in the original image with a neural network, generate an in-focus person mask of the original image for one or more in-focus people in the original image, and apply one or more enhancements to areas of the original image excluding the in-focus person mask.

Other features and advantages will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To assist those of skill in the art in making and using the disclosed systems and methods for content-aware enhancement of images, reference is made to the accompanying figures, wherein.

DETAILED DESCRIPTION

In accordance with embodiments of the present disclosure, exemplary systems for content-aware enhancement of images are provided to generate an improved and realistic output image. The exemplary systems can provide a universal (or substantially universal) technology for improving image quality that can be used in software applications, photo cameras, and mobile devices. The exemplary systems can be used for enhancement of various types of images and can enhance the images in real-time (or substantially real-time). The exemplary systems can be executed on mobile devices, with hardware implementation, or the like. The exemplary systems can be used to detect and identify the types of objects in an image, and adjust local contrast of the objects using various techniques based on the type of object identified in the image. Detail and local contrast can thereby be increased in the image in an object-specific manner without affecting the remaining portions of the image, allowing for enhancement of the object(s) while maintaining the quality of the remaining portions of the image.

The exemplary systems can provide adaptive adjustment of the local contrast in the image depending on what is depicted in the image. Based on training of the neural network, the exemplary systems can identify and segment various objects in the images for enhancement via increased detail and local contrast. Such objects can be, e.g., people, out-of-focus areas, the sky, water, or the like. The exemplary systems can use a super clarity stage to enhance the expressiveness of the image and, optionally, can use a structure booster stage to enhance the details within the image. For example, the super clarity stage can first be applied in a selective manner to the image and, optionally, the structure booster stage can be secondarily applied to the image to enhance the details in the image. In some embodiments, the super clarity stage can be based on a local Laplacian filter, and the structure booster stage can be based on a guided filter. The filters can be applied with different settings to potentially different objects in the image to obtain the desired enhancement results. Each of the stages performed by the exemplary systems will be discussed in greater detail below.

Figure 1:
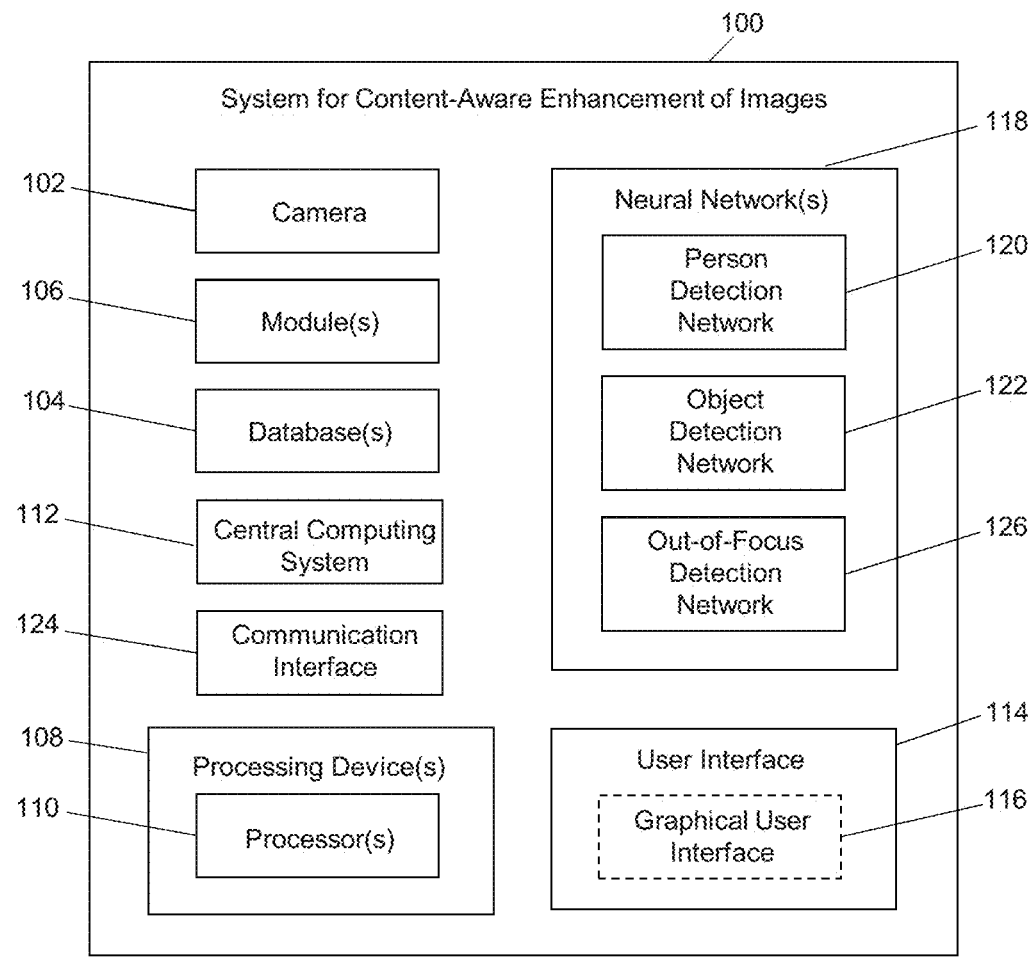
FIG. 1 is a block diagram of an exemplary system for content-aware enhancement of images in accordance with the present disclosure.

FIG. 1 is a block diagram of an exemplary system 100 for content-aware enhancement of images (hereinafter "system 100"). The system 100 includes one or more cameras 102 capable of capturing one or more digital images that can be received as input images by the system 100. The system 100 includes one or more databases 104 configured to receive and electronically store data corresponding to operation of the system 100, including data corresponding to images received, edited and/or enhanced by the system 100. The system 100 includes software units or modules 106 configured to be executed by a processing device 108 to edit, adjust and/or enhance one or more portions/objects of the input images. The processing device 108 can include one or more processors 110 for executing the modules 106.

The system 100 can include a central computing system 112 for controlling the steps performed by the system 100. In some embodiments, the central computing system 112 can include the one or more processing devices 108. The system 100 can include a user interface 114 (e.g., a device with a user interface), such as a user interface having a graphical user interface (GUI) 116. The GUI 116 can be used to input data and/or instructions into the system 100, and to output data and/or images to the user.

The system 100 can include one or more neural networks 118 executed by the processing device 108. The neural network 118 can include a person detection network 120, an object detection network 122, and an out-of-focus detection network 126. The network 118 can be trained via, e.g., manual input, machine learning, historical data input and analysis, combinations thereof, or the like, with sample images to assist in one or more steps of the process performed by the system 100. For example, the network 118 can be trained with sample images to detect and segment specific objects in input images. In some embodiments, the network 118 can be trained to recognize pixels in the input image that correspond with humans or people in the image (or with a high probability of corresponding with humans or people). In some embodiments, the network 118 can be trained to recognize pixels in the input image that correspond with out-of-focus areas in the image. In some embodiments, the network 118 can be trained to recognized pixels in the input image that correspond with non-human objects in the image (or with a high probability of corresponding with non-human objects). The network 118 used can be small and fast to ensure efficient processing of the images within the system 100.

The person detection network 120 can be selected to precisely segment humans or people from the original image, the object detection network 122 can be selected to precisely segment non-human objects from the original image, and the out-of-focus detection network 126 can be selected to precisely segment out-of-focus objects from the original image, with each network 120, 122, 126 using quantization weights to reduce the size of the networks. In some embodiments, the object detection network 122 can be used to identify and segment the non-human objects based on a dataset with a large number of classes (e.g., buildings, walls, manmade structures, or the like) to identify and segment specific objects in the original image. The system 100 can include a communication interface 124 configured to provide communication and/or transmission of data between the components of the system 100 shown in FIG. 1.

Figure 2:
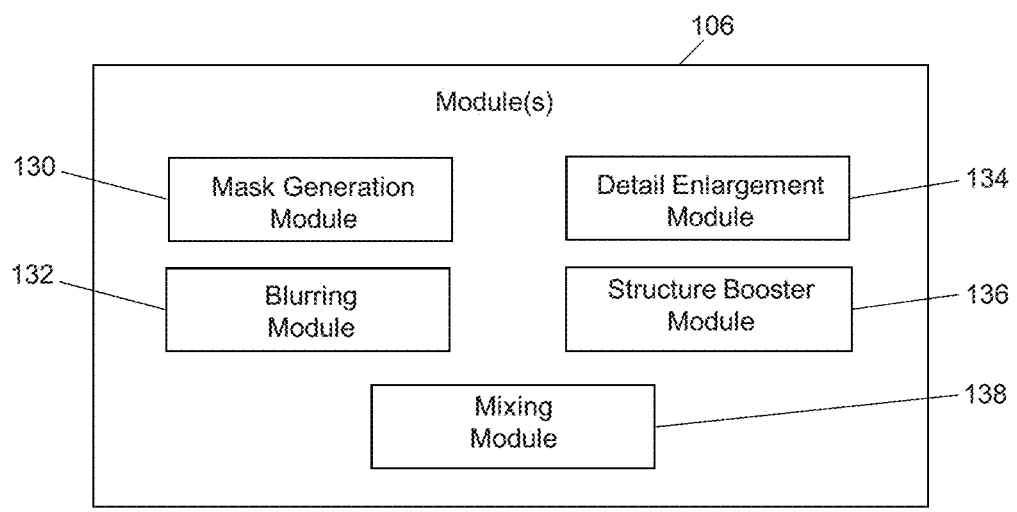
FIG. 2 is a block diagram of exemplary modules of a system for content-aware enhancement of images in accordance with the present disclosure.

FIG. 2 is a block diagram illustrating the software modules 106 of the system 100 in greater detail. Although illustrated as separate modules, in some embodiments, the modules can be combined or separated into one or more modules. For example, the modules can be combined into a single module and/or any of the modules can be distributed in the system 100. In some embodiments, the system 100 can include, e.g., a mask generation module 130, a blurring module 132, a detail enlargement module 134, a structure booster module 136, and a mixing module 138. Each of the modules 106 can be executed to perform one or more tasks. In some embodiments, the detail enlargement module 134 and the structure booster module 136 can be separated into multiple individual modules configured to perform each of the respective tasks performed by the detail enlargement module 134 and the structure booster module 136. Execution and operation of each of the modules 106 will be discussed in detail below with reference to sample images.

Figure 3:
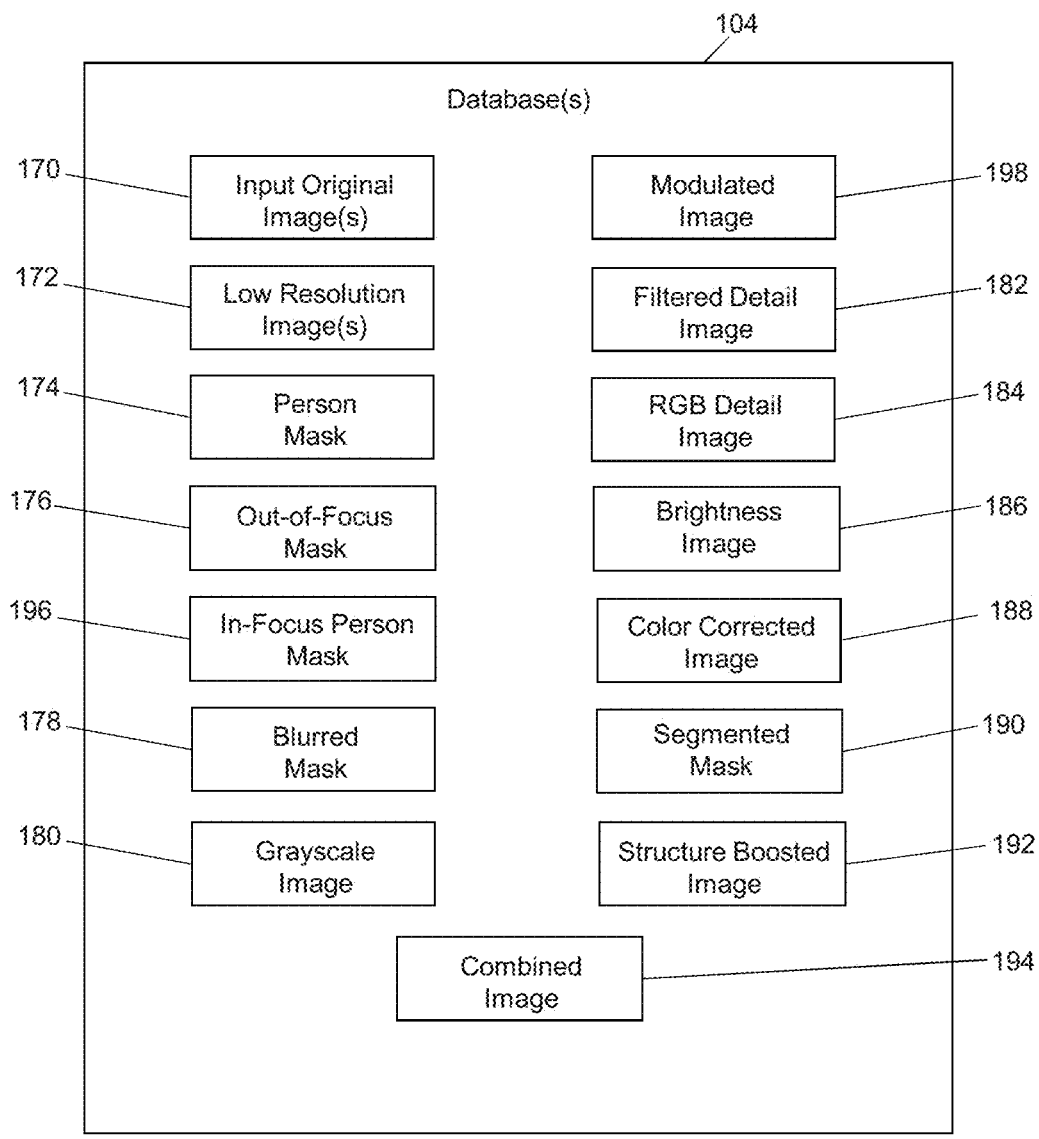
FIG. 3 is a block diagram of an exemplary database of a system for content-aware enhancement of images in accordance with the present disclosure.

FIG. 3 is a block diagram illustrating the database 104 of the system 100 in greater detail. The database 104 can electronically receive and/or store data corresponding to, e.g., input original images 170, low resolution images 172, person masks 174, out-of-focus masks 176, in-focus person masks 196, blurred masks 178, grayscale images 180, filtered detail images 182, red-green-blue (RGB) detail images 184, brightness images 186, color corrected images 188, segmented masks 190, structure boosted images 192, and combined images 194 (e.g., final enhanced images). The data electronically received and/or stored in the database 104 will be discussed in detail below with reference to sample images and the modules 106 of FIG. 2.

Figure 4:
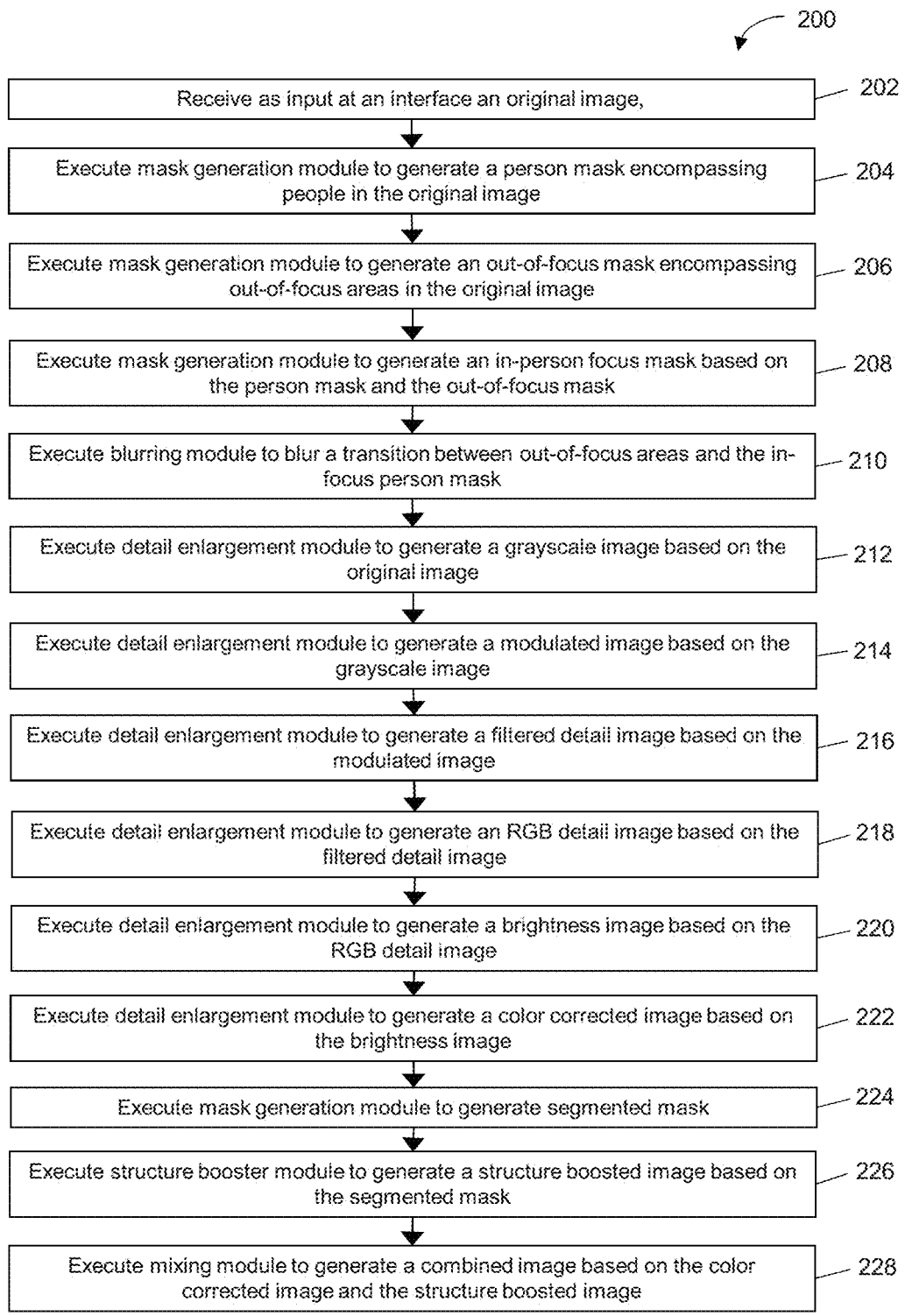
FIG. 4 is a flowchart illustrating an exemplary process of implementing a system for content-aware enhancement of images in accordance with the present disclosure.

FIG. 4 is a flowchart 200 illustrating overall process steps executed by the system 100. To begin at step 202, an original image is received by the system, the original image having one or more in-focus people and one or more out-of-focus areas. At step 204, the mask generation module can be executed by the processing device to generate a person mask (e.g., a neural network mask) encompassing people in the original image. At step 206, the mask generation module can be executed by the processing device to generate an out-of-focus mask encompassing out-of-focus areas in the original image. At step 208, the mask generation module can be executed by the processing device to generate an in-focus person mask based on the person mask and the out-of-focus mask. At step 210, the blurring module can be executed by the processing device to blur a transition between out-of-focus areas and the in-focus person mask.

At step 212, the detail enlargement module can be executed by the processing device to generate a grayscale image based on the original image. A step 214, the detail enlargement module can be executed by the processing device to generate a modulated image based on the grayscale image. At step 216, the detail enlargement module can be executed by the processing device to generate a filtered image based on the modulated image. At step 218, the detail enlargement module can be executed by the processing device to generate an RGB detail image based on the filtered detail image. At step 220, the detail enlargement module can be executed by the processing device to generate a brightness image based on the RGB detail image. At step 222, the detail enlargement module can be executed by the processing device to generate a color corrected image based on the brightness image. In some embodiments, each of steps 210-222 can be performed by individual or separate modules within the detail enlargement module.

At step 224, the mask generation module can be executed by the processing device to generate a segmented mask. At step 226, the structure booster module can be executed by the processing device to generate a structure boosted image based on the segmented mask. As step 228, the mixing module can be executed by the processing device to generate a combined image based on the color corrected image and the structure boosted image. Details of the process 200 and additional optional steps will be discussed in greater detail below in combination with the sample images.

Figure 5:
FIG. 5 is an exemplary input original image in accordance with the present disclosure.

With reference to FIG. 5, an exemplary input original image 170 is provided. The image 170 can be received as input by the system 100 and electronically stored in the database 104. Each input original image 170 includes one or more in-focus people 300 (e.g., a foreground) and one or more out-of-focus areas 302 (e.g., a background). For example, the in-focus people 300 in FIG. 5 include a single person, and the out-of-focus areas 302 include people, a road, grass, and a building. In some embodiments, the system 100 can generate a low resolution image 172 of the input original image 170 for further processing to optimize or improve the operational speed of the system 100 in enhancing the original image 170. The low resolution image 172 can be electronically stored in the database 104. Although operation of the system 100 is discussed with respect to the input original image 170, in some embodiments, the system 100 can perform the steps discussed herein with the low resolution image 172.

Figure 6:
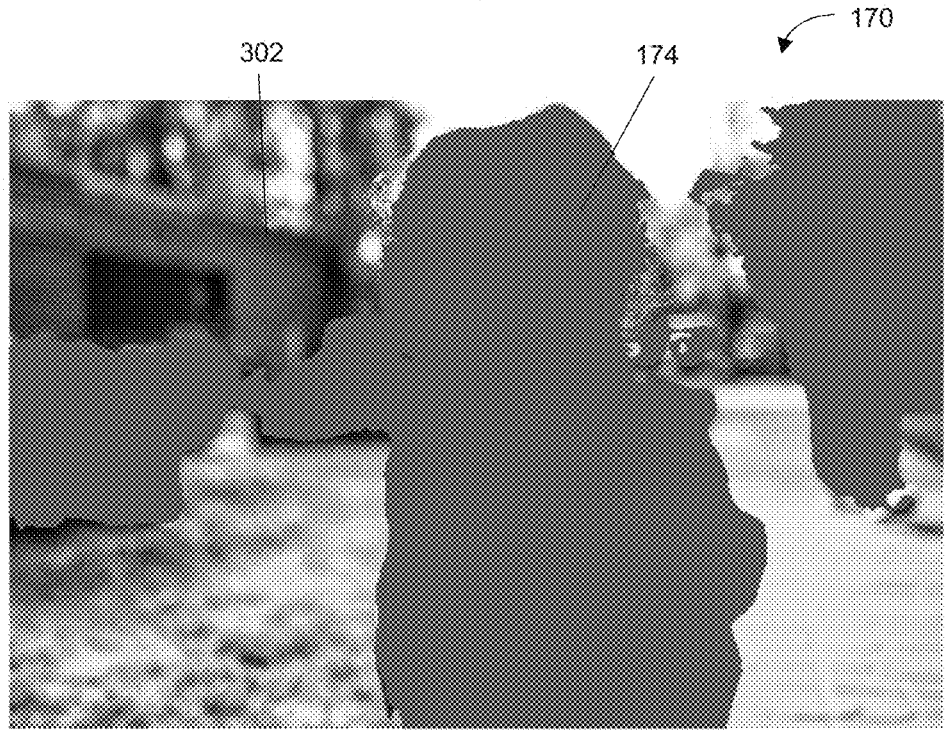
FIG. 6 is an exemplary image including a person mask in accordance with the present disclosure.

With reference to FIG. 6, the mask generation module 130 can receive as input the original image 170, and is executed by the processing device 108 to generate a person mask 174 (e.g., a neural network mask encompassing all people) to be electronically stored in the database 104. The mask generation module 130 can operate in combination with the neural network 118 to recognize and segment people within the image 170. For example, the person detection network 120 of the neural network 118 can be trained to detect, define and segment pixels the network 120 believes are associated with people in the image 170 (e.g., pixels having a high probability of being associated with people). In some embodiments, the person detection network 120 can be trained to detect objects within the image 170 that correspond to shapes associated with the human form, with such objects being designated by the mask generation module 130 as a person. The mask generation module 130 and the neural network 118 thereby receive as input the image 170 and generate the person mask 174 for each pixel of the image 170 in which a person is detected. As an example, a probability value can be used for determining the probability of the pixel being associated with a person. In some embodiments, the probability value can be a value in the range of 0% (negative or not a person) to 100% (positive or a person). In some embodiments, if the neural network 118 and/or the person detection network 120 is unsure whether a person is detected, a value of 85% or 90% can be applied by the system 100. In some embodiments, the mask generation module 130 and the neural network 118 can generate the person mask 174 for each pixel of the image 170 having a probability value of, e.g., 85% or higher, 90% or higher, 95% or higher, or the like. In some embodiments, a different probability value or threshold can be used for generation of the person mask 174 depending on the architecture of the neural network 118. For clarity, FIG. 6 illustrates the person mask 174 in red. The person mask 174 not only captures the in-focus person at the front of the image 170, but also encompasses any people in the out-of-focus areas 302 to create a distinction between any human and non-human objects in the image 170. If the mask generation module 130 provides a person mask 174 that is empty or has a value of 0, the mask generation module 130 can determine that people are not included or detected in the image 170.

Figure 7:
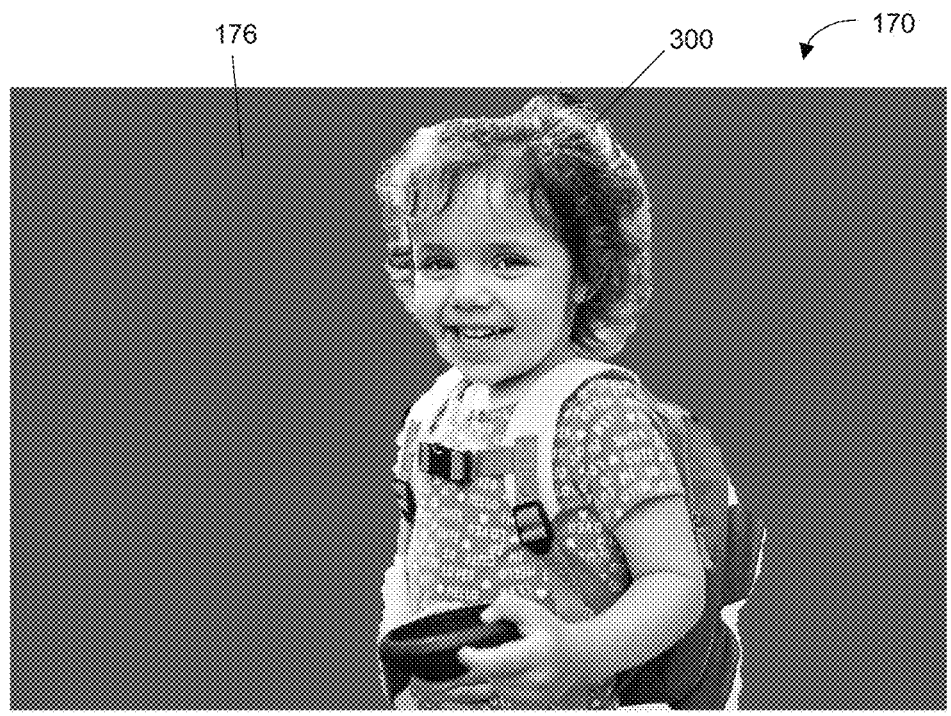
FIG. 7 is an exemplary image including an out-of-focus mask in accordance with the present disclosure.

With reference to FIG. 7, the mask generation module 130 can receive as input the original image 170, and is executed by the processing device 108 to generate an out-of-focus mask 176 (e.g., a neural network mask encompassing all out-of-focus objects, human and non-human) to be electronically stored in the database 104. The mask generation module 130 can operate in combination with the neural network 118 to recognize and segment out-of-focus areas or objects within the image 170. For example, the out-of-focus detection network 126 of the neural network 118 can be trained to detect, define and segment pixels the network 126 believes are associated with out-of-focus areas in the image 170 (e.g., pixels having a high probability of being out-of-focus). The mask generation module 130 and the neural network 118 thereby receive as input the image 170 and generate the out-of-focus mask 176 for each pixel of the image 170 in which out-of-focus objects or areas are detected. As an example, a probability value can be used for determining the probability of the pixel being associated with an out-of-focus area. In some embodiments, the probability value can be a value in the range of 0% (negative or not an out-of-focus object/area) to 100% (positive or an out-of-focus object/area). In some embodiments, if the neural network 118 and/or the out-of-focus detection network 126 is unsure whether an out-of-focus area is detected, a value of 85% or 90% can be applied by the system 100. In some embodiments, the mask generation module 130 and the neural network 118 can generate the out-of-focus mask 176 for each pixel of the image 170 having a probability value of, e.g., 85% or higher, 90% or higher, 95% or higher, or the like. In some embodiments, a different probability value or threshold can be used for generation of the out-of-focus mask 176 depending on the architecture of the neural network 118. For clarity, FIG. 7 illustrates the out-of-focus mask 176 in red. The out-of-focus mask 176 encompasses both human and non-human objects that are out-of-focus to create a distinction between in-focus and out-of-focus objects in the image 170. In some embodiments, the system 100 can automatically set a threshold value for determining whether objects or areas are out-of-focus or in focus. In some embodiments, the threshold value for determining whether objects or areas are out-of-focus or in focus can be automatically updated by the neural network 118. In some embodiments, the threshold value for determining whether objects or areas are out-of-focus or in focus can be set or adjusted by the user of the system 100. If the mask generation module 130 provides an out-of-focus mask 176 that is empty or has a value of 0, the mask generation module 130 can determine that out-of-focus areas are not included or detected in the image 170.

Figure 8:
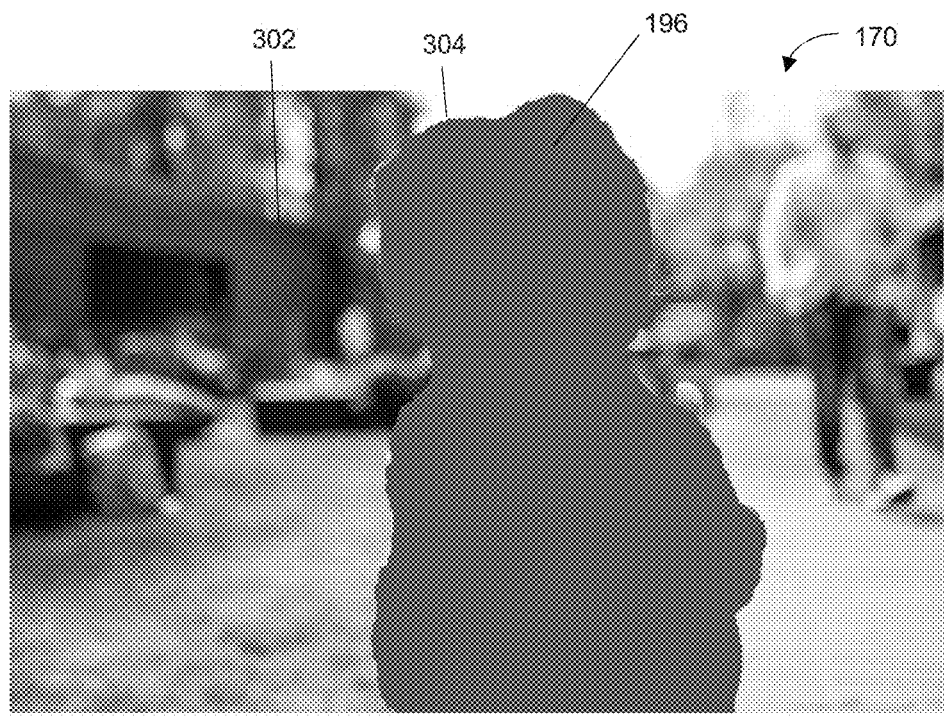
FIG. 8 is an exemplary image including an in-focus person mask in accordance with the present disclosure.

With reference to FIG. 8, the mask generation module 130 can receive as input the original image 170, the person mask 174, and the out-of-focus mask 176, and is executed by the processing device 108 to generate an in-focus person mask 196 to be electronically stored in the database 104. The mask generation module 130 can exclude the out-of-focus mask 176 from the person mask 174 to obtain the in-focus person mask 196. The in-focus person mask 196 includes a border 304 extending along the edge of the in-focus person mask 196 and separating the in-focus person mask 196 from the out-of-focus area 302. In some embodiments, the blurring module 132 can receive as input the original image 170 and the in-focus person mask 196, and is executed by the processing device 108 to generate a blurred mask 178.

The blurred mask 178 can apply a blur effect along the border 304 of the in-focus person mask 196 to soften the transition between the in-focus person mask 196 and the out-of-focus area 302, thereby avoiding abrupt transitions that may appear unrealistic after enhancement of the image 170. Enhancement of the image 170 can be performed on the out-of-focus area 302 excluded by the in-focus person mask 196 to ensure that the details associated with the in-focus person encompassed by the in-focus person mask 196 remains clear. In some embodiments, the user interface 114 can include a selection (e.g., a slider bar) capable of being used to select the strength or intensity of the application force associated with enhancements made to the out-of-focus area 302. Such adjustment can be used to balance the appearance between the out-of-focus area 302 and the in-focus person encompassed by the in-focus person mask 196 to ensure a realistic output image. Such adjustment can also be used to completely turn off the enhancements applied to the out-of-focus area 302.

Figure 9:
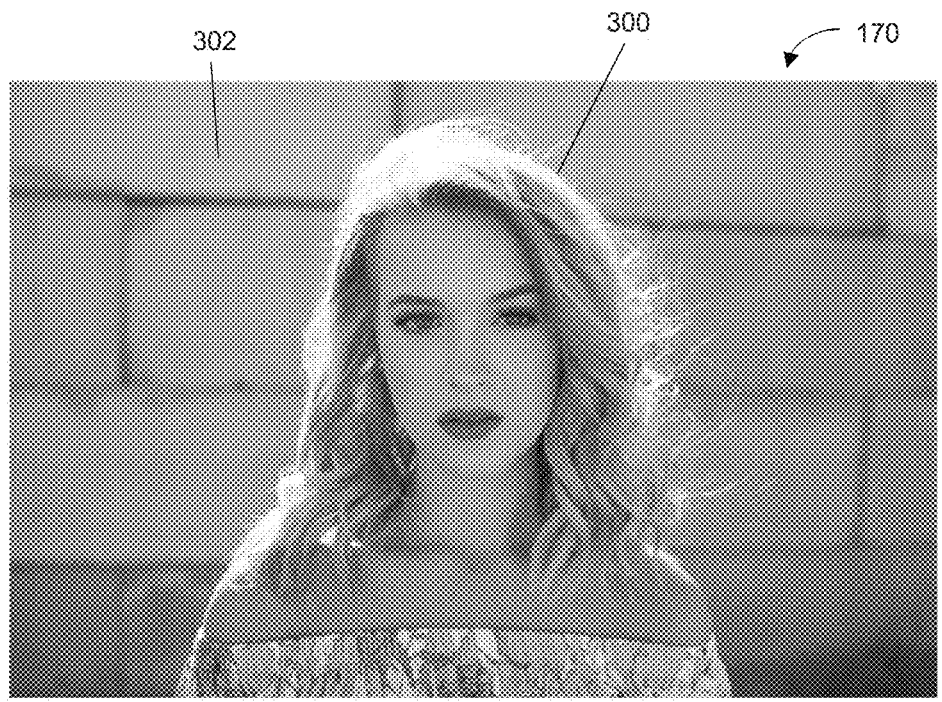
FIG. 9 is an exemplary input original image in accordance with the present disclosure.

With reference to FIG. 9, an original image 170 including a person 300 and an out-of-focus area 302 is provided. The image 170 of FIG. 9 will be used as the base image in describing operation of the detail enlargement module 134. The detail enlargement module 134 can be used to apply the local contrast enhancement to the image 170 by using the masks discussed above. Specifically, the detail enlargement module 134 can use the in-focus person mask 196 to apply the local contrast enhancement to the out-of-focus area 302 not encompassed by the in-focus person mask 196. In some embodiments, a modified Laplacian effect can be used as the basis for the local contrast enhancement.

Figure 10:
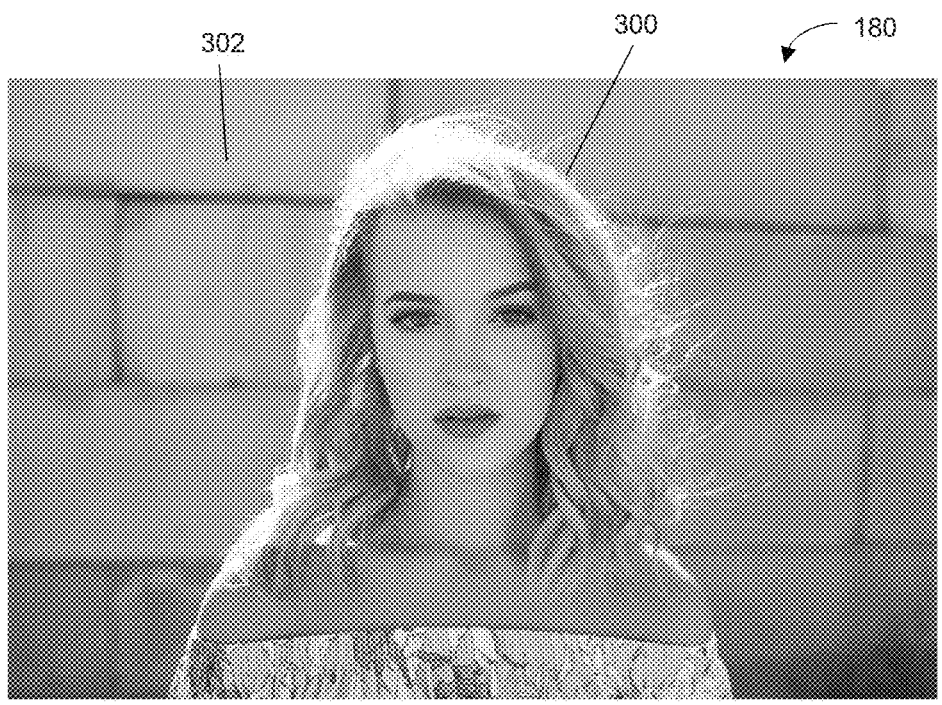
FIG. 10 is an exemplary grayscale image in accordance with the present disclosure.
Figure 11:
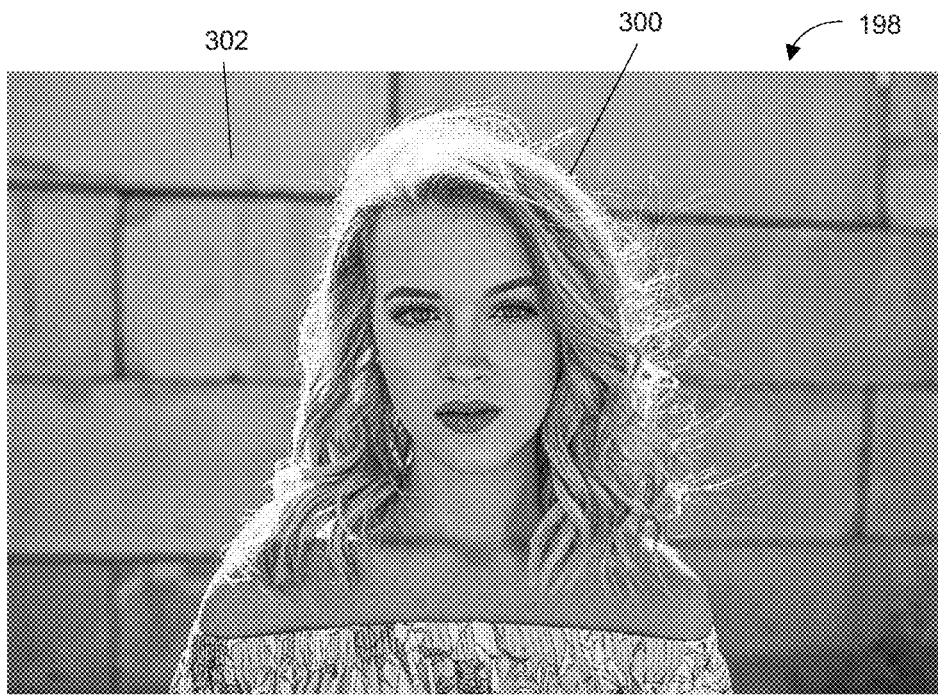
FIG. 11 is an exemplary modulated image in accordance with the present disclosure.

With reference to FIG. 10, the detail enlargement module 134 can receive as input the image 170 of FIG. 9, and is executed by the processing device 108 to generate a grayscale image 180 to be electronically stored in the database 104. With reference to FIG. 11, the detail enlargement module 134 can receive as input the grayscale image 180, and is executed by the processing device 108 to generate a modulated image 198. The modulated image 198 can be generated by applying a Laplacian effect to the grayscale image 180. In some embodiments, a local Laplacian effect can be applied to the grayscale image 180. In some embodiments, a modified local Laplacian effect can be applied to the grayscale image 180 to reduce the speed and/or memory needed by the system 100 for generating the modulated image 198. For example, the modified local Laplacian effect allows the system to operate without extreme memory consumption and/or slowness.

Application of the modified local Laplacian effect can include generating a copy of the grayscale image 180 in the size of, e.g., 920 pixels. In some embodiments, the pixel size of the generated copy of the grayscale image 180 can be a fixed value for each image processed. In some embodiments, the pixel size of the generated copy of the grayscale image 180 can vary depending on the size of the original grayscale image 180. The copy of the grayscale image 180 can be several times smaller in size than the original size of the grayscale image 180. The 920 pixel copy can be processed using the local Laplacian operation. The detail enlargement module 134 can determine a modulation map by dividing the result of the local Laplacian operation into the original grayscale image 180. The detail enlargement module 134 can scale the modulation map result back to the full size of the grayscale image 180, and applies the modulation map to the original, full size grayscale image 180. For example, the modulation map can be multiplied by the original grayscale image 180 to obtain the modulated image 198 (e.g., a modulated grayscale image 180). The modified local Laplacian filter can be applied to the entire image 198 (including the in-focus person 300), with the effect being applied to the in-focus person mask 196. In subsequent enhancement steps, the system 100 uses the in-focus person mask 196 to exclude the Laplacian filter enhancement from the in-focus person 300.

Figure 12:
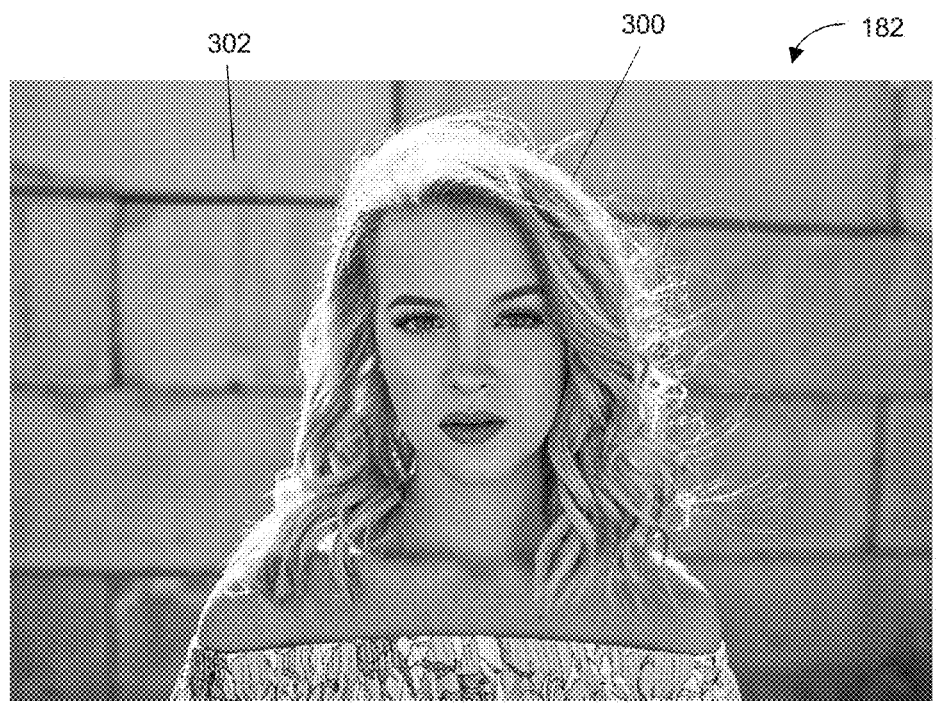
FIG. 12 is an exemplary filtered detail image in accordance with the present disclosure.

With reference to FIG. 12, the detail enlargement module 134 can receive as input the modulated image 198, and is executed by the processing device 108 to generate a filtered detail image 182 to be electronically stored in the database 104. The filtered detail image 182 can be generated by applying a guided filter to the modulated image 198. In some embodiments, the guided filter can use the original image 170 as guidance for applying the filter to the modulated image 198. In some embodiments, a joint up-sampling technique can be used to upscale and generate the filtered detail image 182. The guided filter provides for a softer and more realistic image that does not add artifacts. The guided filter can also reduce the memory requirements for the system 100 by operating with a smaller size image, resulting in faster execution speeds.

Figure 13:
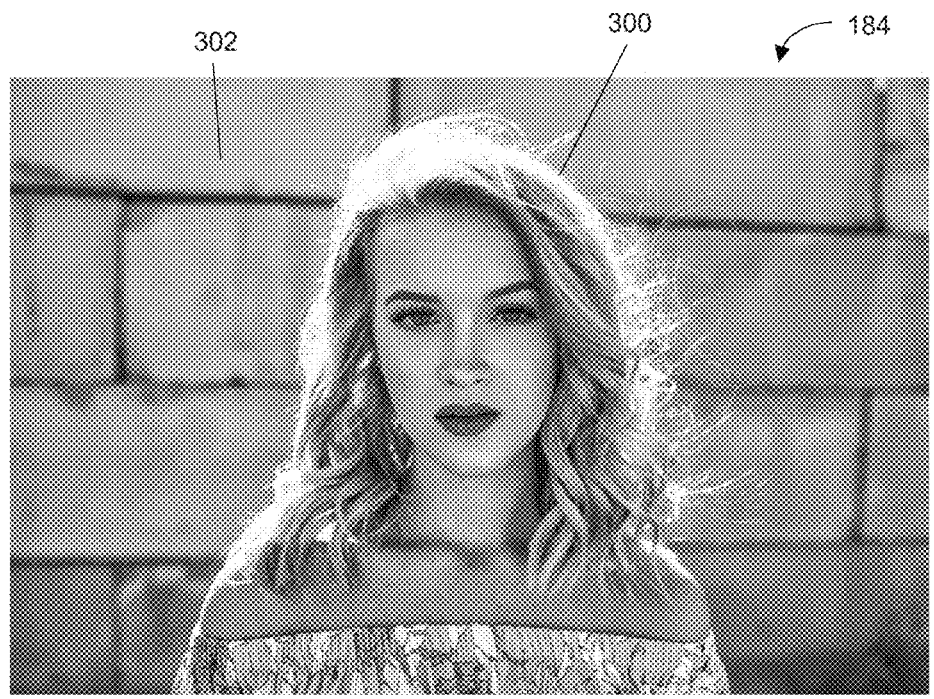
FIG. 13 is an exemplary RGB detail image in accordance with the present disclosure.

With reference to FIG. 13, the detail enlargement module 134 can receive as input the filtered detail image 182, and is executed by the processing device 108 to generate an RGB detail image 184 to be electronically stored in the database 104. The detail enlargement module 134 can change the intensity of each pixel in the filtered detail image 182 using Equations 1-4 to generate the RGB detail image 184:

$$\text{filtered\_grey\_image\_ratio\_map} = \text{filtered\_grey\_image}/\text{original\_grey\_image} \quad (1)$$

$$rgb\_\text{filtered\_image}.r = \text{original\_image}.r * \text{ratio\_map} \quad (2)$$

$$rgb\_\text{filtered\_image}.g = \text{original\_image}.g * \text{ratio\_map} \quad (3)$$

$$rgb\_\text{filtered\_image}.b = \text{original\_image}.b * \text{ratio\_map} \quad (4)$$

where filtered_grey_image ratio_map is the modulated map generated by the detail enlargement module 134, filtered_grey_image is the filtered detail image 182, original_grey_image is the grayscale image 180, and rgb_filtered_image.r is the RGB detail image 184. It is noted that the RGB detail image 184 has unrealistic features. However, by using subsequent enhancement steps, the RGB detail image 184 can be used to generate a realistic, final enhanced image.

Figure 14:
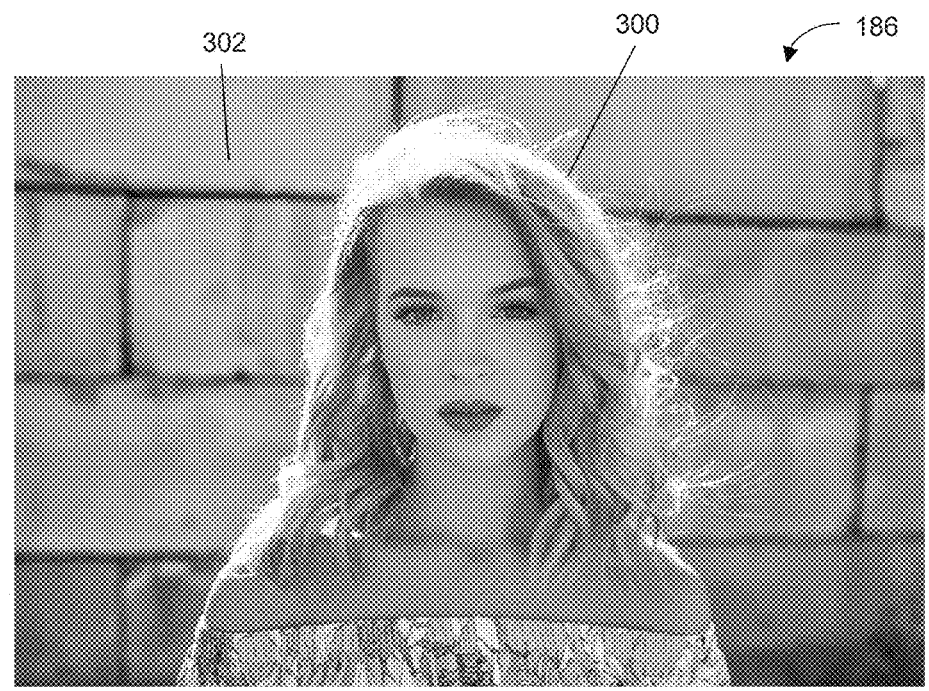
FIG. 14 is an exemplary brightness image in accordance with the present disclosure.

With reference to FIG. 14, the detail enlargement module 134 can receive as input the RGB detail image 182, and is executed by the processing device 108 to generate a brightness image 186 to be electronically stored in the database 104. The detail enlargement module 134 can exclude a person by taking into account changes in brightness in the image 182 and without taking into account increases or changes in the contrast in the image 182. For example, the smooth changes in brightness typically associated with a person based on the associated lighting during capture of the image can be taken into account, without taking into account high-frequency changes in brightness that can result in unnecessary contrast. The brightness highlight changes can be identified by Equation 5:

$$\text{diffs\_image} = \text{rgb\_filtered\_image} - \text{original\_image} \quad (5)$$

where diffs_image is the image taking into account changes in brightness, rgb_filtered_image is the RGB detail image 184, and original image is the original image 170. The detail enlargement module 134 can blur the brightness changes using Equation 6:

$$\text{blurred\_diffs} = \text{blur}(\text{diffs\_image}) \quad (6)$$

wherein blurred_diffs is the blurred brightness changes image, and blur is the blurring function. The detail enlargement module 134 can blend the in-focus person mask 196 with the blurred brightness changes image using Equation 7:

$$\text{image\_without\_people} = \text{original image} + \text{blend}(\text{blurred\_diffs}, \text{diffs\_image}, \text{human\_mask}) \quad (7)$$

wherein image_without_people is an enhanced image including the original image 170 and the blended image of the brightness changes with the in-focus person mask 196, and blend is the blending function. The resulting image, as shown in FIG. 14, has an enhanced brightness as compared to the original image 170.

Figure 15:
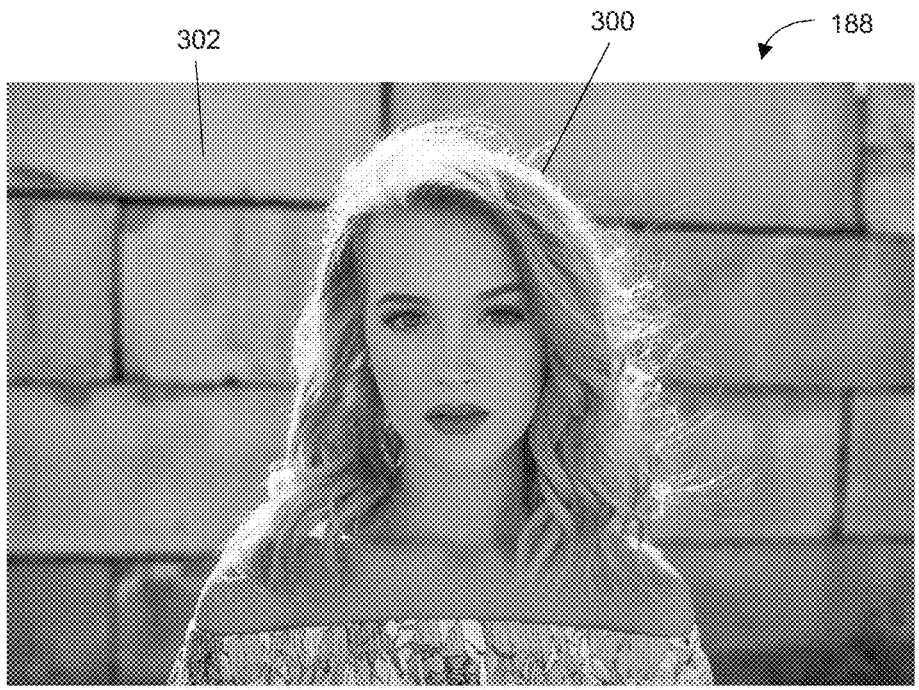
FIG. 15 is an exemplary color corrected image in accordance with the present disclosure.

With reference to FIG. 15, the detail enlargement module 134 can receive as input the brightness image 186, and is executed by the processing device 108 to generate a color corrected image 188 to be electronically stored in the database 104. When details of the original image 170 are corrected or enhanced, the image 170 may lose some saturation. As such, the detail enlargement module 134 can enhance the colors to ensure that the resulting image does not lose color after the prior enhancements, thereby resulting in the color corrected image 188. For each pixel of the image 186, the detail enlargement module 134 can compare the saturation value with the original image 170, leaving the maximum saturation. Specifically, the saturation of each pixel of the image 186 is compared with the original image 170 saturation to keep the maximum saturation to avoid any color shifts. However, such saturation analysis is not performed for the shadows and highlights to avoid the appearance of any color noise. In addition, color noise can be reduced and/or avoided by performing the steps represented by Equations 8-10:

$$\text{rgbOrigin} \rightarrow \text{hsvOrigin} \quad (8)$$

$$\text{rgbProcessed} \rightarrow \text{hsvProcessed} \quad (9)$$

$$\{\text{hueProcessed}, \max(\text{saturationOrigin}, \text{saturationProcessed}), \text{valueProcessed}\} \rightarrow \text{rgbResult} \quad (10)$$

Figure 16:
FIG. 16 is an exemplary color corrected image in accordance with the present disclosure.

In some embodiments, the user interface 114 can provide a slider for weakening, strengthening or excluding application of the super clarity enhancements to the image 170. FIG. 15 can represent the super clarity enhanced image based on the original image 170 of FIG. 9. FIG. 16 represents the super clarity enhanced image based on the original image 170 of FIG. 5.

In some embodiments, the super clarity enhanced image can be used as the final enhanced, combined image 194 output by the system 100 and having the expressiveness enhancement. In some embodiments, the system 100 can perform additional structure booster steps to enhance the details of the image. The structure booster steps can enhance detail in the objects in the image 170 by increasing the fine detail to provide a positive visual effect, and further exclude the effect from areas where an increase in detail would degrade the image 170. The structure booster effect can be applied with different parameters for in-focus areas and out-of-focus areas. The different parameters can affect the strength of the detail enhancement and/or the radius of the blur applied to the image 170. In some embodiments, the sky, people and water can be completely excluded using masks generated by the mask generation module 130.

Figure 17:
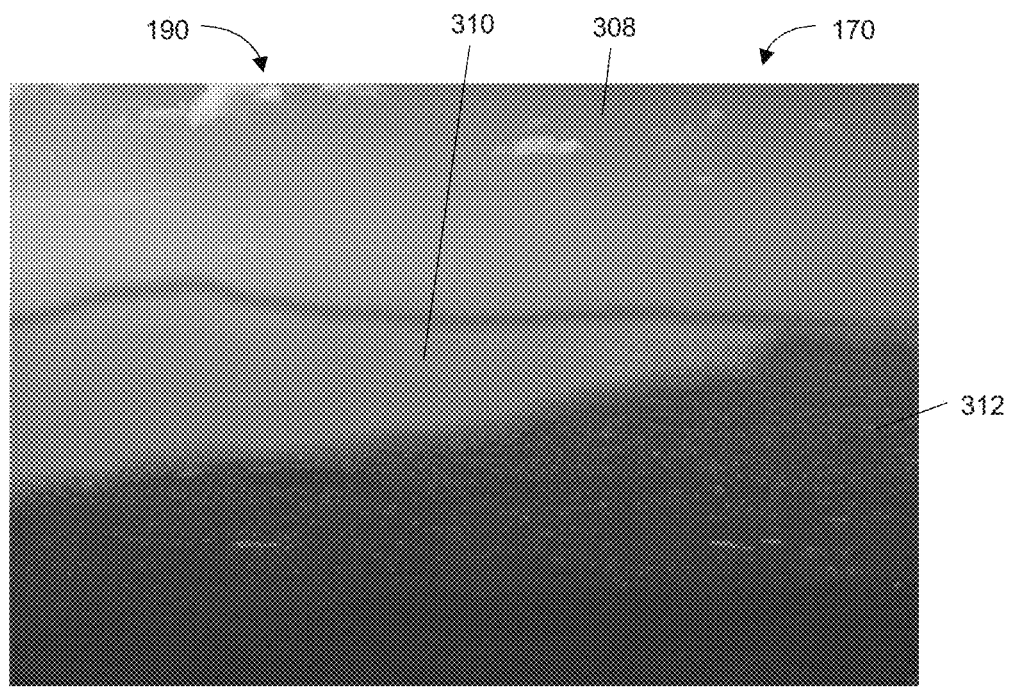
FIG. 17 is an exemplary image including a segmented mask in accordance with the present disclosure.

With reference to FIG. 17, the mask generation module 130 can receive as input the original image 170, and is executed by the processing device 108 to generate a segmented mask 190 to be electronically stored in the database 104 (see, e.g., person mask 196 of FIG. 8). The mask generation module 130 can operate in combination with the neural network 118 to recognize and segment specific objects within the image 170. For example, the object detection network 122 of the neural network 118 can be trained to detect, define and segment pixels the network 122 believes are associated with people, the sky, and water in the image 170 (e.g., pixels having a high probability of being associated with people, the sky and water). The mask generation module 130 and the neural network 118 thereby receive as input the image 170 and generate the segmented mask 190 for each pixel of the image 170 in which people, the sky and water are detected. As an example, a probability value can be used for determining the probability of the pixel being associated with people, the sky and water. Although discussed herein as being used for people, the sky and water, it should be understood that the segmented mask 190 could be used for any type of object or set of objects for which modification by the system 100 is to be avoided. In some embodiments, the probability value can be a range from 0% to 100%, with 100% providing the highest possible probability that the pixel is associated with an object. For example, a pixel can have a probability value of 80% water and 20% sky. Each pixel can return a probability value for objects that are included in the pixel.

The segmented mask 190 can be used to highlight areas of the image 170 to be affected by application of the enhancement in the structure booster stage. The system 100 further applies different enhancement strengths for different zones in focus and out-of-focus in the image 170 based on the segmented mask 190. The different strengths are applied because areas out-of-focus may necessitate a different strength or intensity of the enhancement and/or effect settings than the in-focus zone. In FIG. 17, the sky 308 is completely ruled out for enhancement, the green area is the out-of-focus area 310, and the blue area is the in-focus area 312.

The structure booster module 136 can receive as input the original image 170 and the segmented mask 190, and is executed by the processing device 108 to generate the structure boosted image 192 to be electronically stored in the database 104. The structure booster module 136 can apply one or more enhancement effects with different parameters or strengths for the in-focus area 312 and the out-of-focus area 310. The sky, people and water are completely excluded from enhancements based on the segmented mask 190, with enhancements applied to the remaining portions of the image 170. The amount or value of the enhancement strength can be set by the user, automatically set by the system 100 as a constant, combinations thereof, or the like.

The structure booster module 136 can apply a guided filter with the appropriate parameters for the in-focus area 312 and the out-of-focus area 310 in the original image 170. The parameters can be applied with greater strength (e.g., a higher value) for the in-focus area 312, and can be avoided for the out-of-focus area 310 to avoid over-sharpening of the out-of-focus area 310. In some embodiments, the system 100 can determine the numerical value associated with the parameter strength. In some embodiments, a user of the system 100 can manually enter and adjust the parameter strength to be applied by the structure booster module 136. The guided filter application can be represented by Equation 11:

$$\text{output} = \text{guided\_filter}\_rgb(\text{input}) \quad (11)$$

The structure booster module 136 can determine the difference between the guided filter image and the original image 170, as represented by Equation 12:

$$\text{diffs} = \text{output} - \text{input} \quad (12)$$

The structure booster module 136 can reduce the difference in proportion to the strength of the enhancement effect as represented by Equation 13:

$$diffs\_decreased = amount * diffs \quad (13)$$

The structure booster module 136 can apply desaturation with a specific strength to the difference. For example, the strength can be 50% and application of desaturation can be represented by Equation 14:

$$desaturated\_diffs = lerp(diffs\_decreased, rgbToGrey(diffs\_decreased), 0.4) \quad (14)$$

In some embodiments, the strength value can be automatically determined and/or adjusted by the system 100 for each image based on image characteristics. In some embodiments, the strength value can be selected by the user of the system 100. The structure booster module 136 adds 0.5 to the desaturation of Equation 14 as represented by Equation 15:

$$final\_diffs = desaturated\_diffs + 0.5 \quad (15)$$

The structure booster module 136 can blend and overlay the image based on Equation 15 over the original image 170 as represented by Equation 16:

$$output = blendOverlay(input, final\ diffs) \quad (16)$$

The structure booster module 136 can blend the output of Equation 16 with the appropriate mask for the in-focus area 312 and the out-of-focus area 310. As noted above, the structure booster module 136 excludes the sky, people and water (and other objects) from the detail enhancements.

The steps performed by the structure booster module 136 improve the overall detail associated with the non-excluded features of the image 170. The enhanced image is output as the structure boosted image 192. The mixing module 138 of the system 100 can receive as input the color corrected image 188 (e.g., the super clarity image) and the structure boosted image 192, and is executed by the processing device 108 to generate a combined image 194 to be electronically stored in the database 104. The combined image 194 includes a blending of the expressiveness enhancement of the color corrected image 188 and the detail enhancement of the structure boosted image 192.

Figure 18:
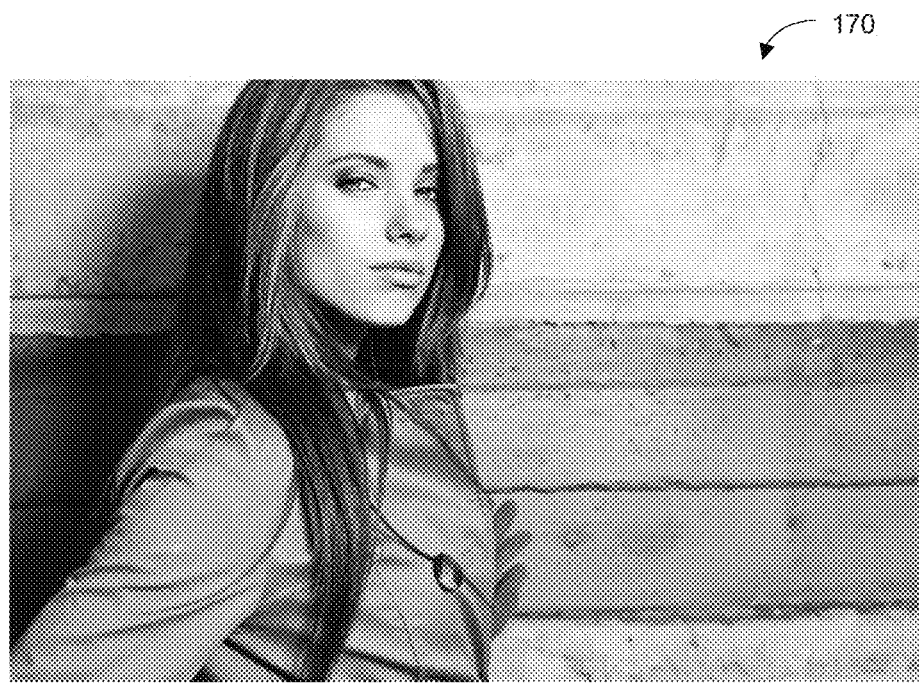
FIG. 18 is an exemplary input original image in accordance with the present disclosure.
Figure 19:
FIG. 19 is an exemplary color corrected image in accordance with the present disclosure.
Figure 20:
FIG. 20 is an exemplary combined image in accordance with the present disclosure.
Figure 21:
FIG. 21 is an exemplary combined image in accordance with the present disclosure.
Figure 22:
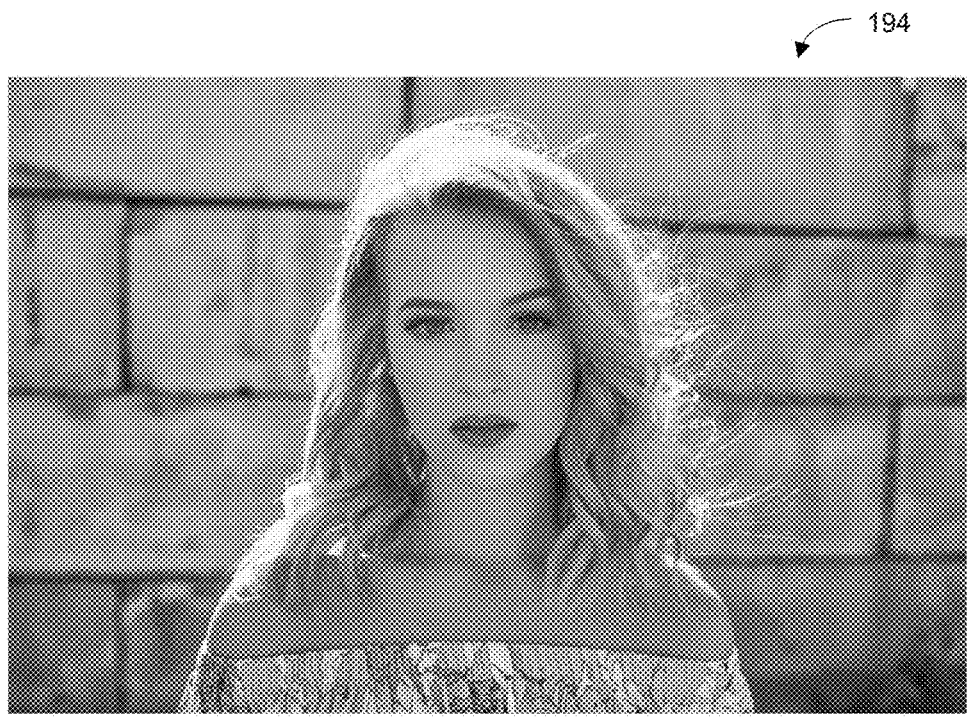
FIG. 22 is an exemplary combined image in accordance with the present disclosure.
Figure 23:
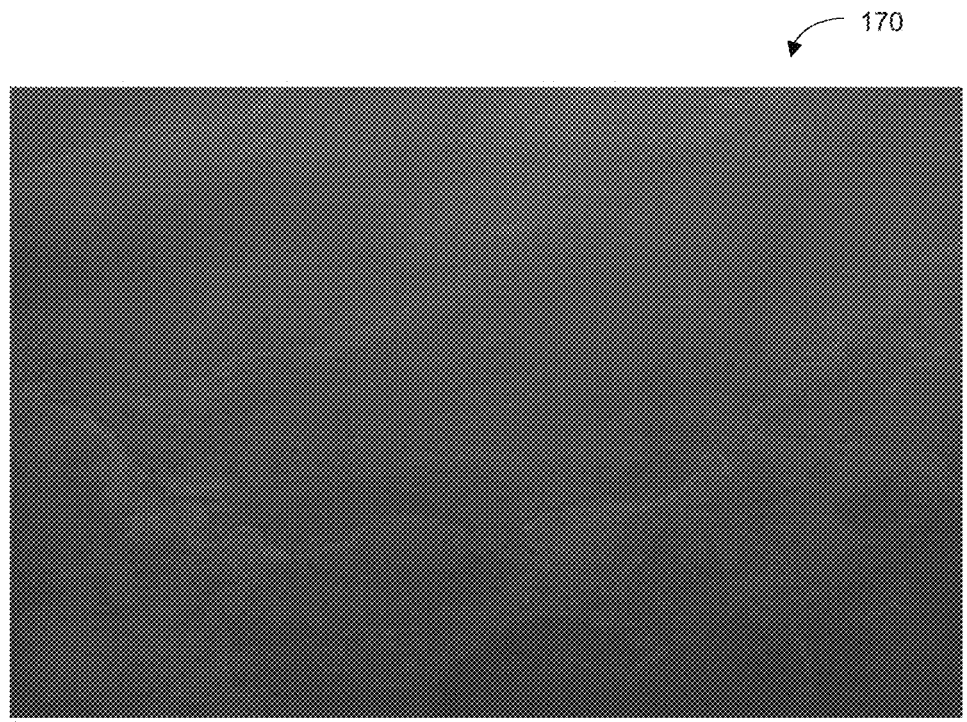
FIG. 23 is an exemplary input original image in accordance with the present disclosure.
Figure 24:
FIG. 24 is an exemplary combined image in accordance with the present disclosure.

FIG. 18 is an original image 170, FIG. 19 is a color corrected image 188 including all enhancements performed by the detail enlargement module 134, and FIG. 20 is a combined image 194 including a blend of both the color corrected image 188 and the structure boosted image 192. FIG. 21 is a combined image 194 based on the original image 170 of FIG. 5 and the color corrected image 188 of FIG. 16. FIG. 22 is a combined image 194 based on the original image 170 of FIG. 9 and the color corrected image 188 of FIG. 15. In some embodiments, the system 100 can be used to clear hazy images (e.g., aerial images) to show the details in such images. For example, FIG. 23 is a hazy original image 170, and FIG. 24 is a combined image 194 including clear and crisp details.

In some embodiments, the system 100 can exclude the enhancement effect from the darkest and lightest areas of the image 170 by applying the enhancement effect to the mid-tones of the image 170 with a substantially full strength, with the lightest and darkest areas having limited strength or sensitivity of the enhancement effect. Applying aggressive detail in the lightest and darkest areas of the tonal range of the image 170 may display unwanted artifacts and can result in an unrealistic image. As such, the full effect of the enhancement can be applied to the mid-tones of the image 170. In some embodiments, the super clarity and structure booster effects can be excluded from the out-of-focus areas of the image 170.

Figure 25:
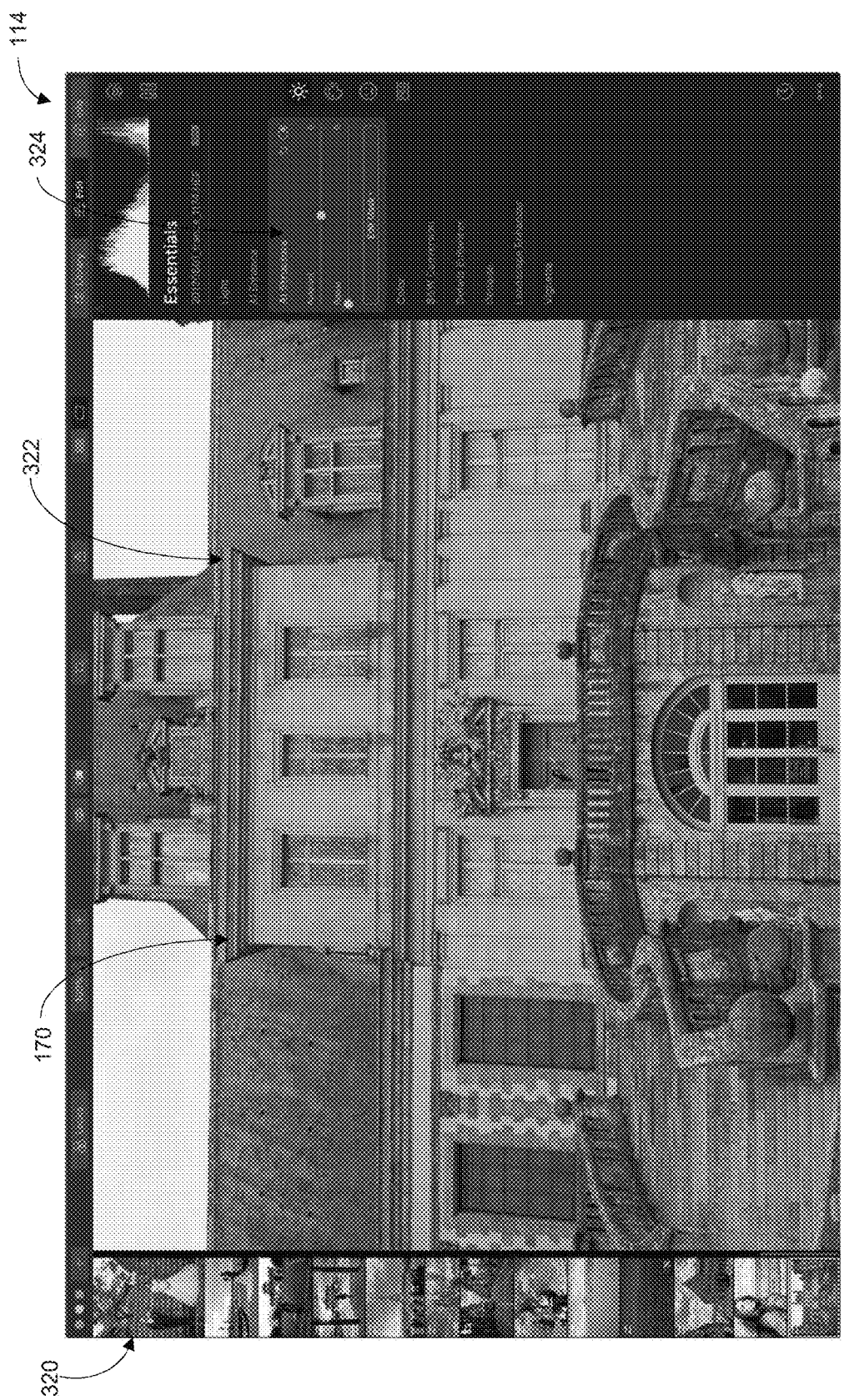
FIG. 25 is a user interface including an input original image in accordance with the present disclosure.

FIG. 25 is a screenshot illustrating a user interface 114 of the system 100 in accordance with the present disclosure. The user interface 114 includes an image selection section 320 including multiple imported images for potential editing. The user interface 114 includes an image section 322 including a single image to be edited by the system 100. The user interface 114 includes an adjustment section 324 including multiple controls in the form of, e.g., sliders, check boxes, input boxes, preset enhancements, combinations thereof, or the like, for various setting controls associated with the image in the image section 322.

Figure 26:
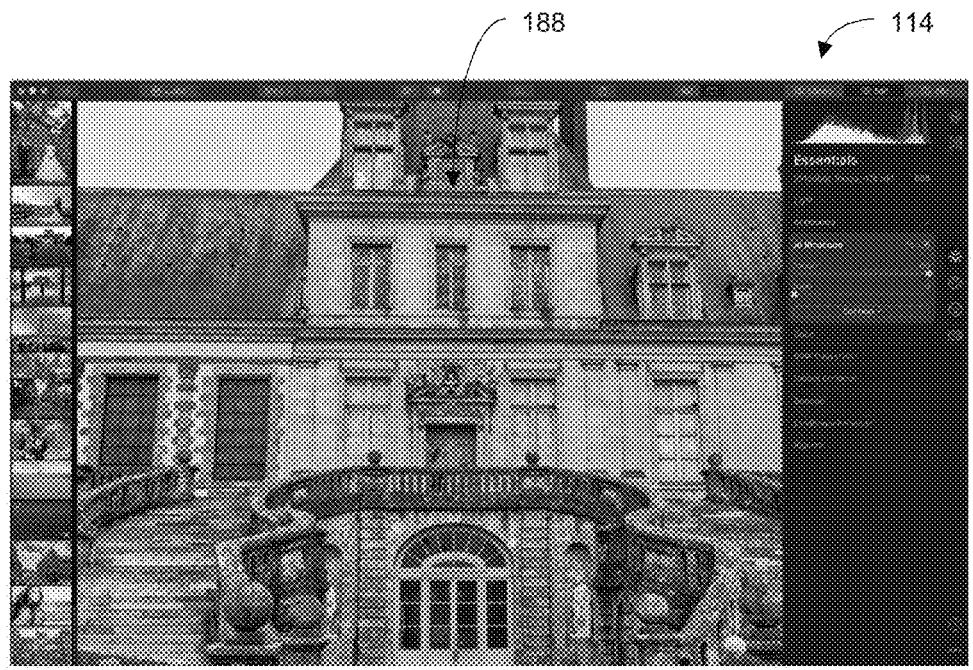
FIG. 26 is a user interface including a color corrected image in accordance with the present disclosure.
Figure 27:
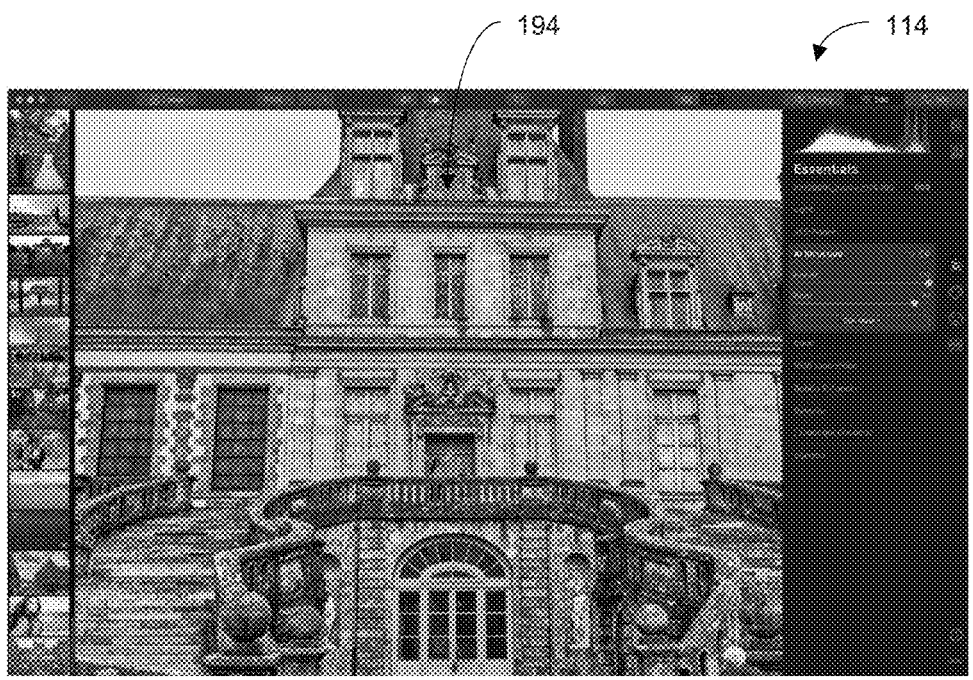
FIG. 27 is a user interface including a combined image in accordance with the present disclosure.

FIG. 25 shows an original input image 170 in the image section 322 prior to application of enhancements. FIG. 26 is a screenshot illustrating a color corrected input image 188 in the image section 322 including the super clarity enhancements, and FIG. 27 is a screenshot illustrating a combined image 190 in the image section 322 including the super clarity and structure booster enhancements.

Figure 28:
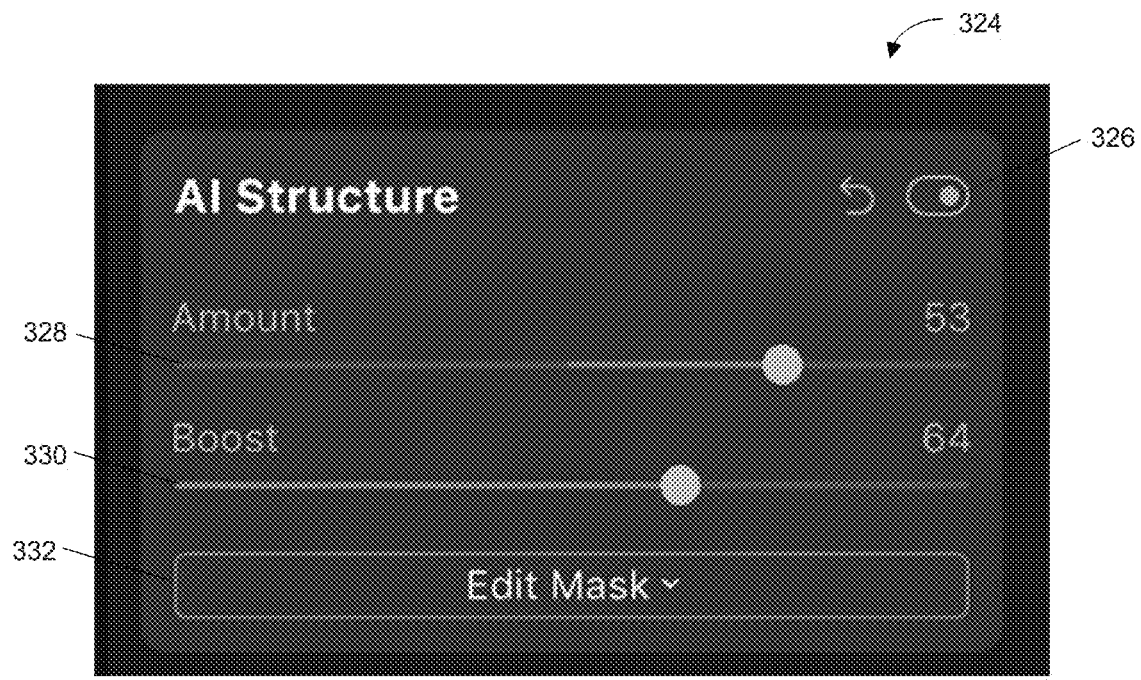
FIG. 28 is an adjustment section of a user interface in accordance with the present disclosure.

FIG. 28 is a screenshot illustrating a detailed view of the adjustment section 324. The adjustment section 324 includes an on/off switch 326 for turning all structure enhancements on and off. The adjustment section 324 includes a slider selector 328 for gradual selection of the amount of the super clarity enhancements and a slider selector 330 for gradual selection of the amount of the structure booster enhancements. The adjustment section 324 includes an edit mask section 332 that can be used to customize or adjust the neural network mask 118. As an example, the edit mask section 332 can allow the user to draw a neural network mask 118 by using brushing tools in the adjustment section 324 to customize areas of the image in which the user wishes to see the mask 118.

In some embodiments, after enhancements have been made to one image to create a final combined image with super clarity and structure booster enhancements, it may be desirable to automatically apply the same enhancements to one or more other input original images 170 in the system 100. The system 100 provides an efficient process for applying or copying the same enhancements to one or more input original images 170 without having to repeat the editing steps again. The user interface 114 includes image selection section 320 (e.g., an image filmstrip in FIG. 25) or an image context menu (e.g., a gallery view) for viewing multiple edited and unedited images.

Figure 29:
FIG. 29 is a detailed submenu of a user interface in accordance with the present disclosure.
Figure 30:
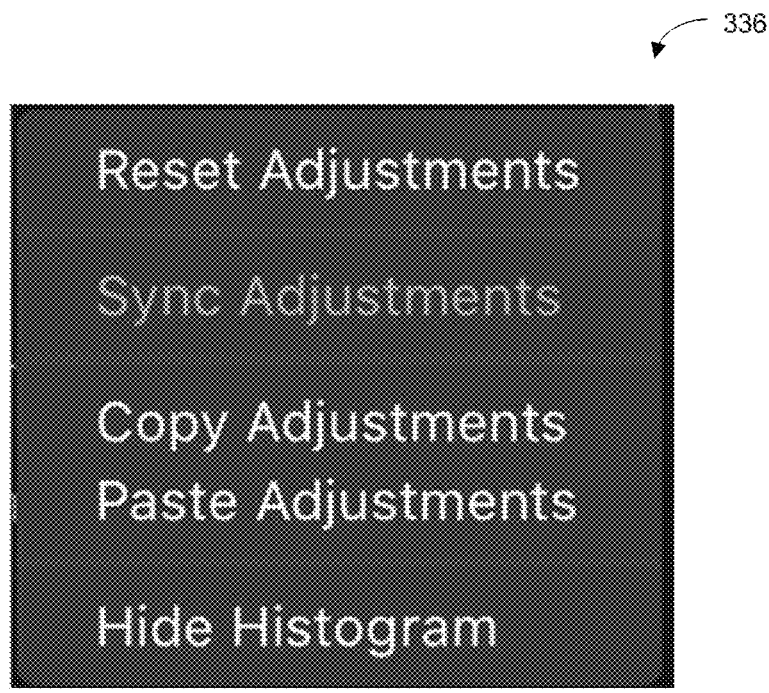
FIG. 30 is a detailed submenu of a user interface in accordance with the present disclosure.

In either the image selection section 320 or the image context menu, a submenu 334 of FIG. 29 can be selected by the user by right-clicking on the combined image 194, choosing adjustments, and copy adjustments to copy the enhancements of the combined image 194. Next, the user can select the input original images 170 in the image selection section 320 or the image context menu for which the same enhancements will be applied and, as shown in FIG. 30, right-clicking on the selected images 170 generates a submenu 336. The submenu 336 can be used to choose copy adjustments to apply or sync the same enhancements to the selected original images 170. The process of copying the enhancements to additional original images 170 in the system 100 can thereby be provided in an efficient and convenient manner.

Figure 31:
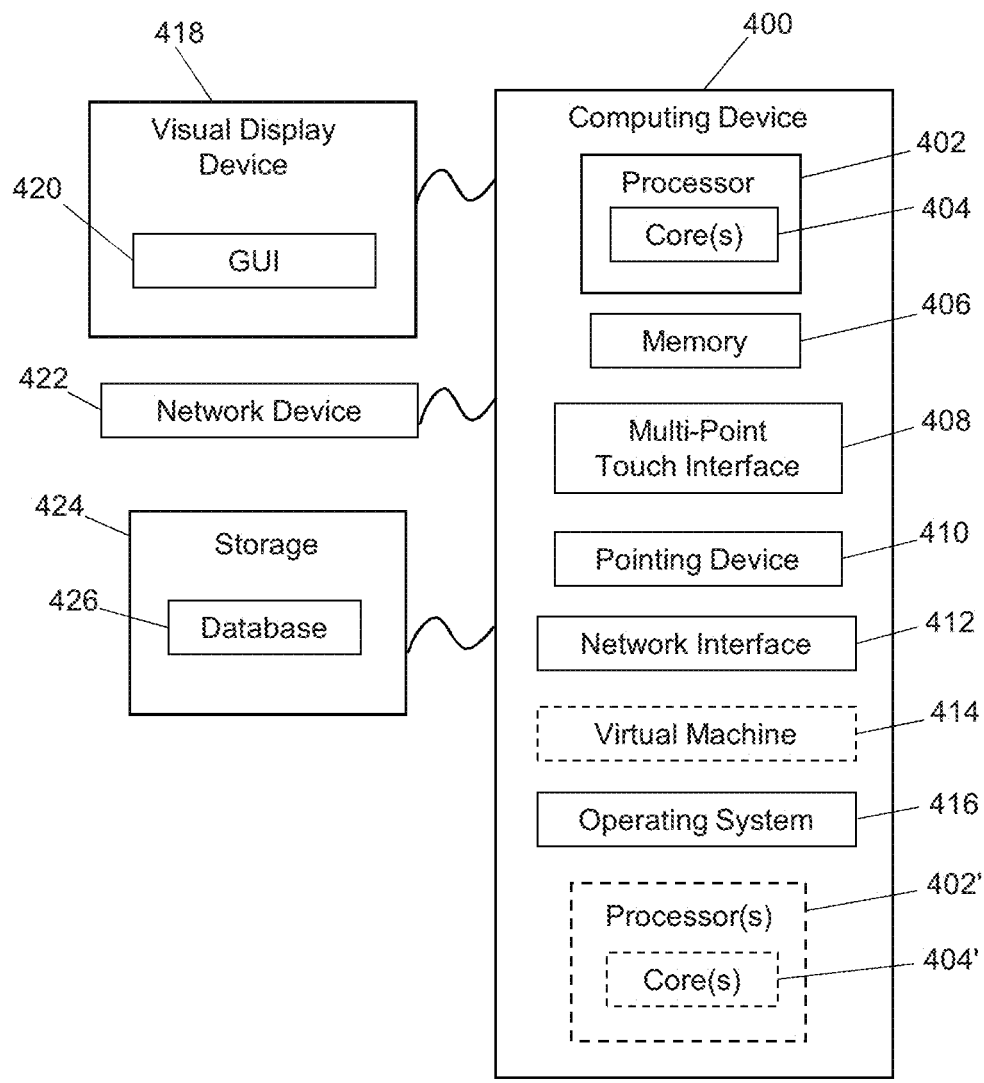
FIG. 31 is a block diagram of an exemplary computing device for implementing the exemplary system for content-aware enhancement of images in accordance with the present disclosure.
Figure 32:
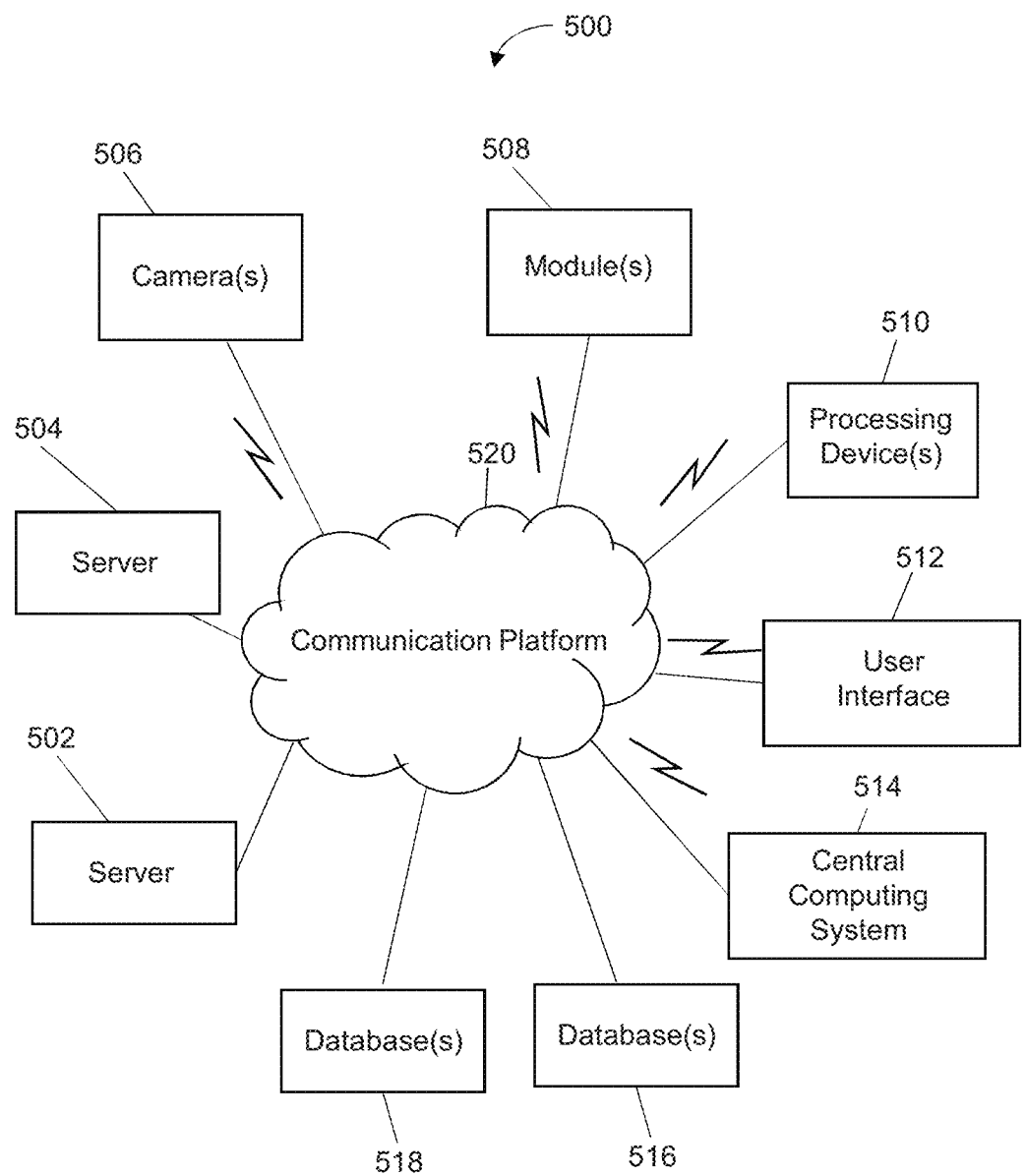
FIG. 32 is a block diagram of an exemplary system for content-aware enhancement of images in images environment in accordance with the present disclosure.

FIG. 31 is a block diagram of a computing device 400 (e.g., a mobile device, a smart device, a computer, or the like) in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for operating the camera, instructions for operating the modules, instructions for operating the database, instructions for operating the processing device, instructions for operating the communication interface, instructions for operating the user interface, instructions for operating the central computing system, instructions for operating the neural network, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display at least one user interface 420 (e.g., a graphical user interface) that may be provided in accordance with exemplary embodiments. The computing device 400 may include other I/O devices for receiving input from a user, for example, a camera, a keyboard, microphone, or any suitable multi-point touch interface 408, a pointing device 410 (e.g., a mouse), or the like. The input interface 408 and/or the pointing device 410 may be coupled to the visual display device 418. The computing device 400 may include other suitable conventional I/0 peripherals.

The computing device 400 may also include at least one storage device 424, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the system described herein. Exemplary storage device 424 may also store at least one database 426 for storing any suitable information required to implement exemplary embodiments. For example, exemplary storage device 424 can store at least one database 426 for storing information, such as data relating to the cameras, the modules, the databases, the central computing system, the communication interface, the processing device, the neural networks, the user interface, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via at least one network device 422 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, a network interface card, a PCMCIA network card, Pa CIPCIe network adapter, an SD adapter, a Bluetooth adapter, a card bus network adapter, a wireless network adapter, a USB network adapter, a modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

FIG. 31 is a block diagram of an exemplary system for selective replacement of objects in images environment 500 in accordance with exemplary embodiments of the present disclosure. The environment 500 can include servers 502, 504 configured to be in communication with one or more cameras 506, one or more modules 508, at least one processing device 510, a user interface 512, and a central computing system 514 via a communication platform 520, which can be any network over which information can be transmitted between devices communicatively coupled to the network. For example, the communication platform 520 can be the Internet, Intranet, virtual private network (VPN), wide area network (WAN), local area network (LAN), and the like. In some embodiments, the communication platform 520 can be part of a cloud environment.

The environment 500 can include repositories or databases 516, 518, which can be in communication with the servers 502, 504, as well as the one or more cameras 506, one or more modules 508, at least one processing device 510, a user interface 512, and a central computing system 514, via the communications platform 520. In exemplary embodiments, the servers 502, 504, one or more cameras 506, one or more modules 508, at least one processing device 510, a user interface 512, and a central computing system 514 can be implemented as computing devices (e.g., computing device 400). Those skilled in the art will recognize that the databases 516, 518 can be incorporated into at least one of the servers 502, 504. In some embodiments, the databases 516, 518 can store data relating to the database 104, and such data can be distributed over multiple databases 516, 518.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for content-aware enhancement of an image, the system comprising:
an interface configured to receive as input an original image; and
a processing device in communication with the interface, the processing device configured to:
(i) process the original image using a neural network to detect one or more objects in the original image;
(ii) generate an in-focus person mask of the original image for one or more in-focus people in the original image; and
(iii) apply one or more enhancements to areas of the original image excluding the in-focus person mask,
wherein the processing device generates a person mask encompassing one or more movie in the original image and an out-of-focus mask encompassing out-of-focus areas in the original image, and
the processing device generates the in-focus person mask, the in-focus person mask being a difference between the person mask and the out-of-focus mask.

2. The system of claim 1, wherein the processing device blurs a transition between the in-focus person mask and out-of-focus areas of the original image.

3. The system of claim 1, wherein the areas excluded the in-focus person mask are out-of-focus areas of the original image.

4. The system of claim 1, wherein the processing device generates a segmented mask based on the original image.

5. The system of claim 4, wherein the segmented mask excludes a sky, water and people in the original image.

6. The system of claim 4, wherein the processing device generates a structure boosted image, the structure boosted image including enhanced details of the original image.

7. The system of claim 6, wherein the processing device generates a combined image.

8. The system of claim 7, wherein the combined image includes a blend between an enhanced image and the structure boosted image.

9. The system of claim 8, wherein:
the interface includes an image selection section with the combined image and one or more additional original images; and
the interface includes a first submenu for selecting the combined image and copying the one or more enhancements applied to the combined image, and the interface includes a second submenu for selecting one or more of the additional original images and applying the copied one or more enhancements of the combined image to the selected one or more of the additional original images.

10. A system for content-aware enhancement of an image, the system comprising:
an interface configured to receive as input an original image; and
a processing device in communication with the interface, the processing device configured to:
(i) process the original image using a neural network to detect one or more objects in the original image;
(ii) generate an in-focus person mask of the original image for one or more in-focus people in the original image; and
(iii) apply one or more enhancements to areas of the original image excluding the in-focus person mask,
wherein the processing device generates a grayscale image based on the original image, and
wherein the processing device generates a modulated image, the modulated image generated by application of a modified Laplacian effect on the grayscale image.

11. The system of claim 10, wherein the processing device generates a filtered detail image, the filtered detail image generated by application of a guided filter on the modulated image.

12. The system of claim 11, wherein the processing device generates a red-green-blue detail image.

13. The system of claim 12, wherein the processing device generates a brightness image, the brightness image depicting changes in brightness across the red-green-blue detail image.

14. The system of claim 13, wherein the processing device generates a color corrected image, the color corrected image correcting saturation loss in the brightness image to enhance colors in the color corrected image.

15. A method for content-aware enhancement of an image, the method comprising:
receiving as input at an interface an original image;
detecting one or more objects in the original image with a neural network;
generating an in-focus person mask of the original image for one or more in-focus people in the original image; and
applying one or more enhancements to areas of the original image excluding the in-focus person mask,
generating a person mask encompassing one or more people in the original image and an out-of-focus mask encompassing out-of-focus areas in the original image, and
wherein the in-focus person mask is a difference between the person mask and the out-of-focus mask.

16. A non-transitory computer-readable medium storing instructions at least for content-aware enhancement of an image that are executable by a processing device, wherein execution of the instructions by the processing device causes the processing device to:
receive as input at an interface an original image;
detect one or more objects in the original image with a neural network;
generate an in-focus person mask of the original image for one or more in-focus people in the original image; and
apply one or more enhancements to areas of the original image excluding the in-focus person mask,
generate a person mask encompassing one or more people in the original image and an out-of-focus mask encompassing out-of-focus areas in the original image, and wherein the in-focus person mask is a difference between the person mask and the out-of-focus mask.

\* \* \* \* \*